US012609981B2

(12) United States Patent
Soodeen et al.

(10) Patent No.: US 12,609,981 B2
(45) Date of Patent: Apr. 21, 2026

(54) REMOTE POINTER FOR SIMULATORS

(71) Applicant: CAE INC., Saint-Laurent (CA)

(72) Inventors: Mark Soodeen, Saint-Laurent (CA);
Nick Giannias, Saint-Laurent (CA);
Andrew Fernie, Saint-Laurent (CA)

(73) Assignee: CAE INC., Saint-Laurent (CA)

( * ) Notice: Subject to any disclaimer, the term of this
patent is extended or adjusted under 35
U.S.C. 154(b) by 153 days.

(21) Appl. No.: 18/259,857

(22) PCT Filed: Jan. 26, 2022

(86) PCT No.: PCT/IB2022/050687
§ 371 (c)(1),
(2) Date: Jun. 29, 2023

(87) PCT Pub. No.: WO2022/162560
PCT Pub. Date: Aug. 4, 2022

(65) Prior Publication Data
US 2024/0089311 A1 Mar. 14, 2024

Related U.S. Application Data

(60) Provisional application No. 63/141,804, filed on Jan.
26, 2021.

(51) Int. Cl.
*H04L 65/75* (2022.01)
*G06V 10/25* (2022.01)
(Continued)

(52) U.S. Cl.
CPC ............ *H04L 65/762* (2022.05); *G06V 10/25*
(2022.01); *G09B 9/08* (2013.01); *H04L*
*65/403* (2013.01); *H04N 7/15* (2013.01)

(58) Field of Classification Search
CPC . G09B 9/08; G09B 9/302; G09B 9/04; G09B
9/165; G09B 9/003; G09B 9/006;
(Continued)

(56) References Cited

U.S. PATENT DOCUMENTS 9,282,301 B1 * 3/2016 Cederlof .............. H04N 9/3147
9,578,076 B2 * 2/2017 Olivier .................. H04L 65/613
(Continued)

FOREIGN PATENT DOCUMENTS

CN 111728697 A 10/2020
JP 9055923 A 2/1997
(Continued)

OTHER PUBLICATIONS

European search report, Application nb 22745469.1 , dated Dec. 9,
2024, European Patent search office.
(Continued)

*Primary Examiner* — David R Lazaro
(74) *Attorney, Agent, or Firm* — Johann Gest; Fasken
Martineau DuMoulin

(57) ABSTRACT

There is provided a computer-implemented method for
remotely pointing to a region of interest within a simulation
environment, the process comprising the steps of: receiving
coordinates of at least one point selected within a given
image of at least a portion of the simulation environment, the
given image being displayed on a display unit; identifying a
region of interest within the simulation environment based
on the received coordinates of the at least one point; and
providing control signals to a projector to visually distin-
guish the region of interest within the simulation environ-
ment.

20 Claims, 11 Drawing Sheets

150

(51) Int. Cl.
  *G09B 9/08* (2006.01)
  *H04L 65/403* (2022.01)
  *H04N 7/15* (2006.01)

(58) Field of Classification Search
  CPC . G09B 9/063; G09B 9/10; G09B 9/36; G09B 5/14; G09B 9/12; G09B 9/301; G09B 9/307; G09B 19/00; G09B 19/003; G09B 19/165; G09B 19/24; G09B 5/02; G09B 9/14; G09B 9/206; G09B 9/24; G09B 9/26; G09B 9/30; G09B 9/304; G09B 9/32; G09B 9/44; G02B 27/017; G02B 2027/014; G02B 2027/0187; G02B 27/0172; G02B 2027/0141; G02B 2027/0165; G02B 27/0093; G02B 27/0176; G06T 15/205; G06T 17/20; G06T 19/006; G06T 19/20; G06T 2215/16; G06T 9/20; G06T 13/00; G06T 11/00; G06T 11/60; H04L 65/1089; H04L 65/613; H04L 12/1822; H04L 12/1827; H04L 51/10; H04L 51/18; H04L 65/1093; H04L 65/403; H04L 65/612; H04L 65/762; H04L 67/12; H04L 67/131; G06F 3/011; G06F 3/012; G06F 3/013; G06F 3/016; G06F 3/017; G06F 3/0205
  See application file for complete search history.

(56) References Cited

U.S. PATENT DOCUMENTS

| | | | | |
|---|---|---|---|---|
| 10,598,932 | B1* | 3/2020 | Marshall | G06T 11/00 |
| 12,073,517 | B2* | 8/2024 | Soodeen | G09B 9/165 |
| 2007/0146484 | A1 | 6/2007 | Horton et al. | |
| 2008/0206720 | A1* | 8/2008 | Nelson | G09B 9/165 434/44 |
| 2009/0310094 | A1* | 12/2009 | Jung | H04N 9/3194 353/121 |
| 2012/0281092 | A1 | 11/2012 | Olivier et al. | |
| 2013/0323695 | A1* | 12/2013 | Zboray | G09B 19/00 434/219 |
| 2014/0057229 | A1 | 2/2014 | Groteluschen | |
| 2014/0368410 | A1 | 12/2014 | Imai | |
| 2015/0111180 | A1 | 4/2015 | Wheller | |
| 2015/0379884 | A1* | 12/2015 | Saltzman | G09B 9/08 434/59 |
| 2016/0019808 | A1 | 1/2016 | Chavez et al. | |
| 2019/0134506 | A1* | 5/2019 | Gupta | G09B 19/0038 |
| 2019/0244537 | A1* | 8/2019 | Liberatore | G06F 3/0205 |
| 2019/0304177 | A1* | 10/2019 | Lasnier | G09B 9/10 |
| 2019/0304178 | A1* | 10/2019 | Lasnier | G06T 17/20 |
| 2019/0304179 | A1* | 10/2019 | Lasnier | G09B 9/10 |
| 2020/0336706 | A1 | 10/2020 | Schmirler et al. | |
| 2021/0049925 | A1* | 2/2021 | Robinson | G09B 9/302 |
| 2021/0390879 | A1 | 12/2021 | Sivaratri et al. | |
| 2021/0407314 | A1* | 12/2021 | Sivaratri | G09B 9/304 |
| 2022/0006989 | A1* | 1/2022 | Beier | H04N 9/3147 |
| 2022/0139252 | A1* | 5/2022 | Sawyer | G09B 9/165 |
| 2023/0410434 | A1* | 12/2023 | Soodeen | G06T 13/00 |
| 2024/0089311 | A1* | 3/2024 | Soodeen | H04N 7/15 |

FOREIGN PATENT DOCUMENTS

| | | | | |
|---|---|---|---|---|
| JP | 2002207832 | A | 7/2002 | |
| JP | 2010086193 | A | 4/2010 | |
| JP | 2010108511 | A | 5/2010 | |
| JP | 2014119720 | A | 6/2014 | |
| WO | 2005093687 | A1 | 2/2008 | |
| WO | WO-2019119022 | A1 * | 6/2019 | G03B 29/00 |

OTHER PUBLICATIONS

Examination report, Application nb 523450066 dated Jan. 22, 2025, Saudi Arabia Patent Office.
Examination report, Application nb 3,203,334 dated Feb. 27, 2025, Canadian Patent Office.
Examination Report dated Nov. 19, 2025 Application Nb 2023-545851, Japanese Patent Office.
Completion of Introduction of the Tokaido Shinkansen Emergency Training Simulator, Central Japan Railway Company (JR Central), Press Release, Apr. 16, 2020.
Reproducing Natural Disasters and Train Fires: Tokaido Shinkansen 'Emergency Training Simulator' Unveiled, Railway Newspaper, Railway News [online], Nov. 13, 2020. Retrieved from <URL: https://tetsudo-shimbun.com/article/topic/entry-2938.html> [Retrieved on Nov. 10, 2025].

* cited by examiner

10

100

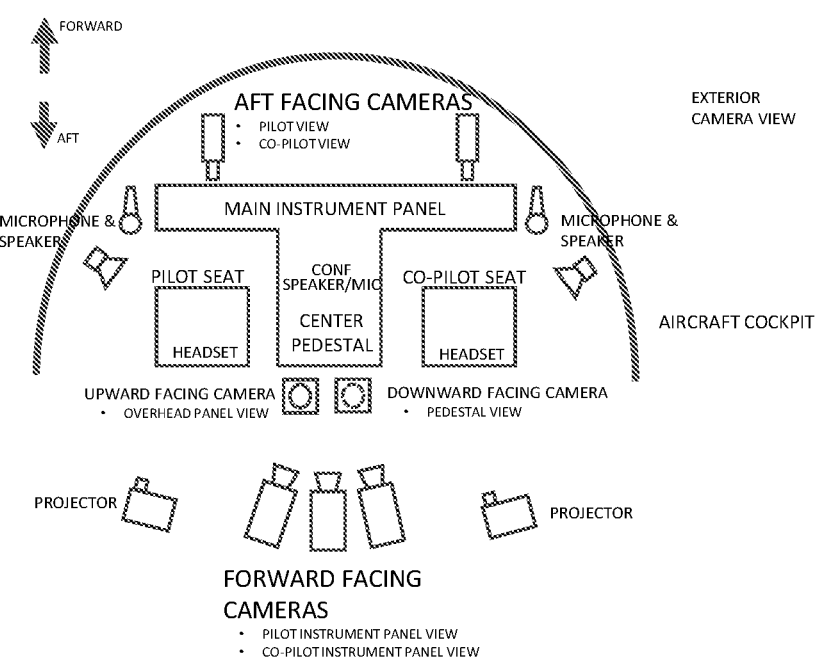

FORWARD

AFT

AFT FACING CAMERAS
• PILOT VIEW
• CO-PILOT VIEW

EXTERIOR
CAMERA VIEW

MAIN INSTRUMENT PANEL

MICROPHONE &
SPEAKER

MICROPHONE &
SPEAKER

PILOT SEAT

CONF
SPEAKER/MIC

CO-PILOT SEAT

AIRCRAFT COCKPIT

CENTER
PEDESTAL

HEADSET

HEADSET

UPWARD FACING CAMERA
• OVERHEAD PANEL VIEW

DOWNWARD FACING CAMERA
• PEDESTAL VIEW

PROJECTOR

PROJECTOR

FORWARD FACING
CAMERAS
• PILOT INSTRUMENT PANEL VIEW
• CO-PILOT INSTRUMENT PANEL VIEW
• FULL COCKPIT VIEW

Providing a given image of at least a portion of the simulator for display on a remote display unit ⎯152

Receiving coordinates of at least one point selected within the given image ⎯154

Identifying a region of interest within the simulator based on the received coordinates of selected point(s) ⎯156

Visually distinguishing the region of interest ⎯158

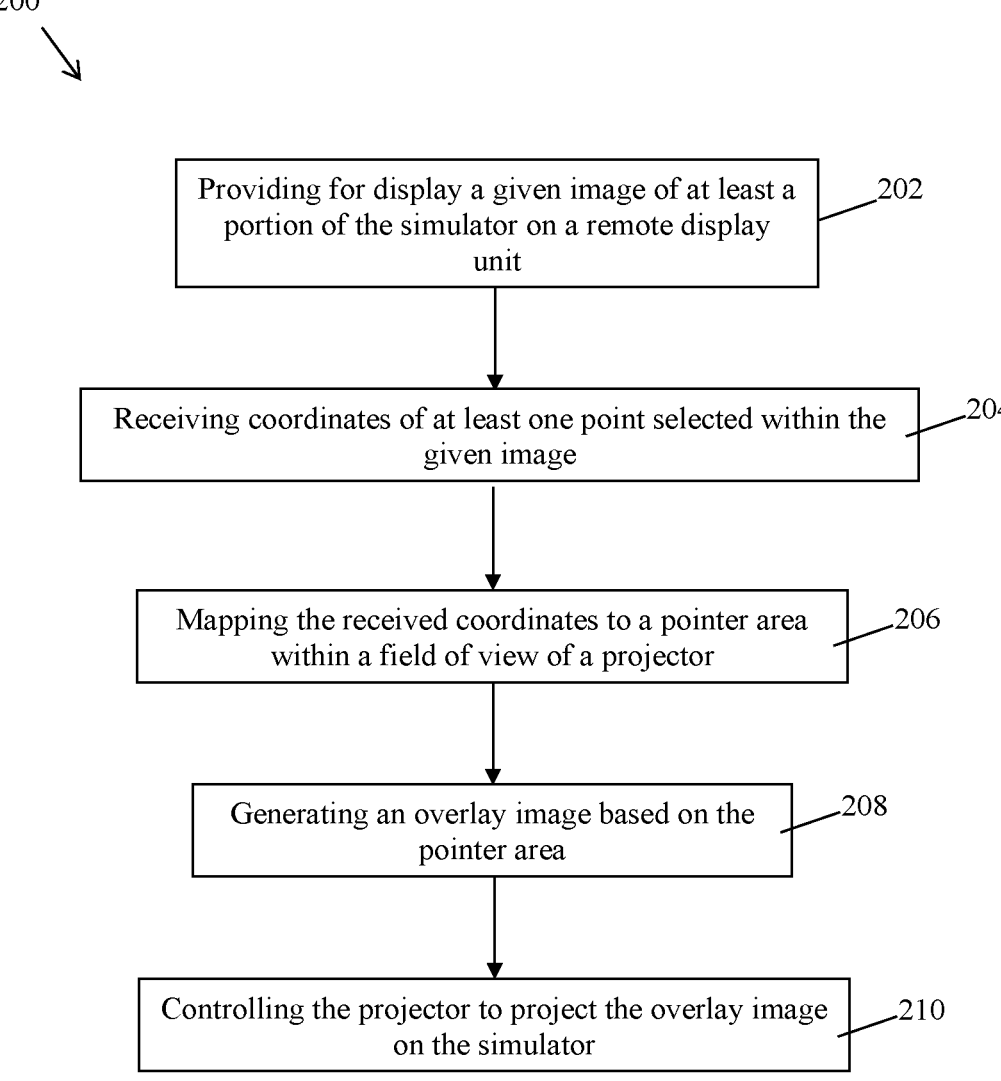

200

Providing for display a given image of at least a portion of the simulator on a remote display unit ⟍202

Receiving coordinates of at least one point selected within the given image ⟍204

Mapping the received coordinates to a pointer area within a field of view of a projector ⟍206

Generating an overlay image based on the pointer area ⟍208

Controlling the projector to project the overlay image on the simulator ⟍210

REMOTE POINTER FOR SIMULATORS

TECHNICAL FIELD

The present invention relates to the field of simulation, and more particularly to the remote access and/or control of simulation environments.

BACKGROUND

Aircraft simulators are used for training and evaluating pilots and copilots. To do so, the person responsible for the training or evaluation of a pilot or copilot is physically present within the simulator.

However, it may be desirable to provide third parties such as existing clients, potential clients, regulatory bodies, and flight instructors with remote visual access to the simulation environment. This is particularly true during pandemics. Some custom solutions for providing such access exist, but their design and implementation are time-consuming and/or expensive.

Therefore, there is a need for an improved method and system for remotely pointing to a region of interest within a simulation environment.

SUMMARY

According to a first broad aspect, there is provided a computer-implemented method for remotely pointing to a region of interest within a simulation environment, the process comprising the steps of: receiving coordinates of at least one point selected within a given image of at least a portion of the simulation environment, the given image being displayed on a display unit; identifying a region of interest within the simulation environment based on the received coordinates of the at least one point; and providing control signals to a projector to visually distinguish the region of interest within the simulation environment.

In one embodiment, the step of identifying the region of interest within the simulator comprises mapping the received coordinates to a pointer area within a coordinate system associated with the projector; and the step of providing control signals comprises generating an overlay image based on the pointer area, the overlay image encompassing the region of interest, and providing the control signals to the projector to project the overlay image on the simulator.

In one embodiment, the step of mapping the received coordinates to the pointer area comprises: mapping the received coordinates to at least one given point within a coordinate system of the simulation environment; and mapping the at least one given point to the pointer area within the coordinate system associated with the projector.

In one embodiment, the method further comprises establishing over a telecommunication network a connection between a first videoconferencing client running on a first computer and a second videoconferencing client running on a second computer; and transmitting through the first videoconferencing client the given image to the second computer, the second computer providing the given image for display on remote display unit, wherein said receiving the coordinates comprises receiving the coordinates through the first videoconferencing client from the second computer over the secure public network.

In one embodiment, the telecommunication network comprises one of a public network, a secure public network, a private network and a secure private network.

In one embodiment, the step of providing the control signals comprises selecting the projector amongst a plurality of available projectors based on the received coordinates and providing the control signals to the selected projector.

In one embodiment, the step of providing the control signals comprises determining a target position for the projector, the target position ensuring that the region of interest is contained within a field of view of the projector and providing the control signals being further indicative of the target position.

In one embodiment, the method further comprises receiving the given image of the at least a portion of the simulation environment from a camera located within the simulation environment.

In one embodiment, the method further comprises generating the given image of at least a portion of the simulation environment.

In one embodiment, the step of generating the given image is performed using a 3D model of the simulation environment.

In one embodiment, the step of receiving coordinates comprises receiving coordinates for a plurality of points selected within the given image, the step of identifying the region of interest comprises identifying a plurality of regions of interest based on the received coordinates for the plurality of points, and the step of providing the control signals comprises providing the control signals to the projector to visually and concurrently distinguish the plurality of regions of interest within the simulation environment.

In one embodiment, the method further comprises selecting at least one characteristic for the pointer area, the control signals being indicative of the at least one characteristic.

In one embodiment, the at least one characteristic comprises at least one of a shape, an intensity and a color.

In one embodiment, the method further comprises providing remote visibility into the simulation environment by: establishing over a secure public network a connection between a first videoconferencing client running on a first computer and a second videoconferencing client running on a second computer; receiving at the first computer a first live camera feed over a secure private network, the live camera feed encompassing a first portion of the simulation environment and being captured by a first camera, the second computer being located outside of the secure private network; displaying within a viewer application running on the first computer the first live camera feed and at least one of: a simulation control interface; a computer-generated representation of a second portion of the simulation environment; and a second live camera feed captured by a second camera and encompassing a third portion of the simulation environment different from the first portion; and granting the second videoconferencing client visual access to the viewer application through the first videoconferencing client.

In one embodiment, the method further comprises: receiving at the first computer a live audio feed from a microphone present in the simulation environment; and transmitting through the first videoconferencing client the live audio feed to the second computer over the secure public network to allow the second computer to play back the live audio feed in substantially real-time.

In one embodiment, the method further comprises: receiving at the first computer and through the first videoconferencing client a live audio feed from the second computer; and transmitting the received live audio feed to a speaker mounted within the simulation environment.

In one embodiment, the simulation environment comprises a flight simulator and the first portion of the simulation environment encompasses a portion of instruments and controls of the flight simulator.

In one embodiment, the at least one video feed comprises at least two video feeds.

In one embodiment, a given one of the at least two video feeds encompasses an internal portion of the flight simulator, the internal portion of the flight simulator comprising a screen of the flight simulator on which images of a computer-generated environment are displayed.

In one embodiment, the flight simulator comprises a motion-based flight simulator and a given one of the at least two video feeds encompasses an external portion of the motion-based flight simulator.

In one embodiment, the viewer application is further configured for providing a view of a simulation control interface of the simulator.

In one embodiment, the simulation control interface comprises an interface of an instructor operating station, the second live camera feed encompassing the instructor operating station.

In one embodiment, the method further comprises receiving the view of the simulation control interface from a simulation engine.

In one embodiment, the viewer application is further configured for providing a view of an interface of a data analytics platform.

In one embodiment, the view of the interface of the data analytics platform corresponds to an image of a display unit on which the interface of the data analytics platform is displayed, the image of the display being captured by a further camera connected to the private network.

In one embodiment, the method further comprises receiving the view of the interface of the data analytics platform from a server hosting the data analytics platform.

In one embodiment, the method further comprises granting the second videoconferencing client control over the viewer application.

In one embodiment, the method further comprises granting the second videoconferencing client control over an interface of an operating system.

In one embodiment, the method further comprises granting the second videoconferencing client control over an interface of a data analytics platform.

In one embodiment, the method further comprises: receiving instructions to project a visual indication within the environment from the first videoconferencing client; and controlling a projector installed within the simulator to project the visual indication.

According to another broad aspect, there is provided a system for remotely pointing to a region of interest within a simulator, the system comprising: a processor; and a non-transitory storage medium operatively connected to the processor, the non-transitory storage medium comprising computer readable instructions, the processor, upon executing the computer readable instructions, being configured for: receiving coordinates of at least one point selected within a given image of at least a portion of the simulation environment, the given image being displayed on a display unit; identifying a region of interest within the simulation environment based on the received coordinates of the at least one point; and providing control signals to a projector to visually distinguish the region of interest within the simulation environment.

In one embodiment, the processor is configured for: mapping the received coordinates to a pointer area within a coordinate system associated with the projector; generating an overlay image based on the pointer area, the overlay image encompassing the region of interest; and providing the control signals to the projector to project the overlay image on the simulator In one embodiment, the processor is configured for: mapping the received coordinates to at least one given point within a coordinate system of the simulation environment; and mapping the at least one given point to the pointer area within the coordinate system associated with the projector.

In one embodiment, the processor is configured for: establishing over a telecommunication network a connection between a first videoconferencing client running on a first computer and a second videoconferencing client running on a second computer; and transmitting through the first videoconferencing client the given image to the second computer, the second computer providing the given image for display on remote display unit, wherein said receiving the coordinates comprises receiving the coordinates through the first videoconferencing client from the second computer over the secure public network.

In one embodiment, the telecommunication network comprises one of a public network, a secure public network, a private network and a secure private network.

In one embodiment, the processor is further configured selecting the projector amongst a plurality of available projectors based on the received coordinates and providing the control signals to the selected projector.

In one embodiment, the processor is further configured for determining a target position for the projector, the target position ensuring that the region of interest is contained within a field of view of the projector and providing the control signals being further indicative of the target position.

In one embodiment, the processor is further configured for receiving the given image of the at least a portion of the simulation environment from a camera located within the simulation environment.

In one embodiment, the processor is further configured for generating the given image of at least a portion of the simulation environment.

In one embodiment, the processor is configured for generating the given image using a 3D model of the simulation environment.

In one embodiment, the processor is configured for receiving coordinates for a plurality of points selected within the given image, identifying a plurality of regions of interest based on the received coordinates for the plurality of points, and providing the control signals to the projector to visually and concurrently distinguish the plurality of regions of interest within the simulation environment.

In one embodiment, the processor is further configured for selecting at least one characteristic for the pointer area, the control signals being indicative of the at least one characteristic.

In one embodiment, the at least one characteristic comprises at least one of a shape, an intensity and a color.

In one embodiment, the system is further adapted to providing remote visibility into the simulation environment, the processor being further configured for: establishing over a secure public network a connection between a first videoconferencing client running on a first computer and a second videoconferencing client running on a second computer; receiving at the first computer a first live camera feed over a secure private network, the live camera feed encompassing a first portion of the simulation environment and being captured by a first camera, the second computer being located outside of the secure private network; displaying within a viewer application running on the first computer the first live camera feed and at least one of: a simulation control interface; a computer-generated representation of a second portion of the simulation environment; and a second live camera feed captured by a second camera and encompassing a third portion of the simulation environment different from the first portion; and granting the second videoconferencing client visual access to the viewer application through the first videoconferencing client.

In one embodiment, the processor is further configured for: receiving at the first computer a live audio feed from a microphone present in the simulation environment; and transmitting through the first videoconferencing client the live audio feed to the second computer over the secure public network to allow the second computer to play back the live audio feed in substantially real-time.

In one embodiment, the processor is further configured for: receiving at the first computer and through the first videoconferencing client a live audio feed from the second computer; and transmitting the received live audio feed to a speaker mounted within the simulation environment.

In one embodiment, the simulation environment comprises a flight simulator and the first portion of the simulation environment encompasses a portion of instruments and controls of the flight simulator.

In one embodiment, the at least one video feed comprises at least two video feeds.

In one embodiment, a given one of the at least two video feeds encompasses an internal portion of the flight simulator, the internal portion of the flight simulator comprising a screen of the flight simulator on which images of a computer-generated environment are displayed.

In one embodiment, the flight simulator comprises a motion-based flight simulator and a given one of the at least two video feeds encompasses an external portion of the motion-based flight simulator.

In one embodiment, the viewer application is further configured for providing a view of a simulation control interface of the simulator.

In one embodiment, the simulation control interface comprises an interface of an instructor operating station, the second live camera feed encompassing the instructor operating station.

In one embodiment, the processor is further configured for receiving the view of the simulation control interface from a simulation engine.

In one embodiment, the viewer application is further configured for providing a view of an interface of a data analytics platform.

In one embodiment, the view of the interface of the data analytics platform corresponds to an image of a display unit on which the interface of the data analytics platform is displayed, the image of the display being captured by a further camera connected to the private network.

In one embodiment, the processor is further configured for receiving the view of the interface of the data analytics platform from a server hosting the data analytics platform.

In one embodiment, the processor is further configured for granting the second videoconferencing client control over the viewer application.

In one embodiment, the processor is further configured for granting the second videoconferencing client control over an interface of an operating system.

In one embodiment, the processor is further configured for granting the second videoconferencing client control over an interface of a data analytics platform.

In one embodiment, the processor is further configured for: receiving instructions to project a visual indication within the environment from the first videoconferencing client; and controlling a projector installed within the simulator to project the visual indication.

According to a further broad aspect, there is provided a computer program product for remotely pointing to a region of interest within a simulation environment, the computer program product comprising a computer readable memory storing computer executable instructions thereon that when executed by the processor perform the method steps of: receiving coordinates of at least one point selected within a given image of at least a portion of the simulation environment, the given image being displayed on a display unit; identifying a region of interest within the simulation environment based on the received coordinates of the at least one point; and providing control signals to a projector to visually distinguish the region of interest within the simulation environment.

In one embodiment, the computer program product is further adapted to provide remote visibility into the simulation environment, the computer readable memory storing further computer executable instructions thereon that when executed by the processor perform the method steps of: establishing over a secure public network a connection between a first videoconferencing client running on a first computer and a second videoconferencing client running on a second computer; receiving at the first computer a first live camera feed over a secure private network, the live camera feed encompassing a first portion of the simulation environment and being captured by a first camera, the second computer being located outside of the secure private network; displaying within a viewer application running on the first computer the first live camera feed and at least one of: a simulation control interface; a computer-generated representation of a second portion of the simulation environment; and a second live camera feed captured by a second camera and encompassing a third portion of the simulation environment different from the first portion; and granting the second videoconferencing client visual access to the viewer application through the first videoconferencing client.

BRIEF DESCRIPTION OF THE DRAWINGS

Further features and advantages of the present invention will become apparent from the following detailed description, taken in combination with the appended drawings, in which:

FIG. 6 is a conceptual diagram illustrating an exemplary cockpit of an aircraft simulator equipped in accordance with an embodiment;

FIG. 10 is a flow chart illustrating a method for remotely controlling a projector in order to illuminate a region of interest within a simulator, in accordance with an embodiment;

It will be noted that throughout the appended drawings, like features are identified by like reference numerals.

DETAILED DESCRIPTION

In one embodiment, the below-described methods and system may be used in the context of an aircraft simulator for training a pilot and/or a copilot for example. An aircraft simulator usually comprises a training room mimicking an aircraft cockpit. The training room is usually movable to simulate movements of the simulated aircraft. The training room is provided with instruments and controls that usually correspond to or mimic real instruments and controls found in an aircraft. The training room is also usually provided with two seats for the pilot and the copilot. Furthermore, a training room is usually provided with an instructor operating station located behind the seats of the pilot and copilot allowing an instructor to control the simulation and/or monitor the performance of the pilot and copilot during a simulation. For example, an instructor may set the parameters of the simulation or load a given simulation via the instructor operating station. The instructor operating station may also be used by an agent of a regulatory agency such as the Federal Aviation Administration (FAA) for evaluating pilots and/or copilots for renewing their certifications for example.

The usual architecture of an aircraft simulator requires for an instructor or an agent to be physically present in the training room of a simulator to instruct, guide and/or evaluate pilots and/or copilots during a simulation. However, in some particular situations such as during a pandemic, it may be advantageous to instruct, guide and/or evaluate pilots and/or copilots remotely during a simulation. To do so, the present methods and systems provide a third-party person such as an instructor or an agent remote visibility or visual access to at least part of the cockpit or flight deck which comprises the instruments and controls located within the simulator. The present methods and systems may further enable a remote control of the simulation engine by the instructor or agent. The present methods and systems may also provide for communication between the pilot and/or copilot and the third party.

In one embodiment, the present technology is implemented using an off-the-shelf videoconferencing platform which allows for a quick and/or inexpensive implementation regardless of the location and systems used by the third party.

Figure 1:
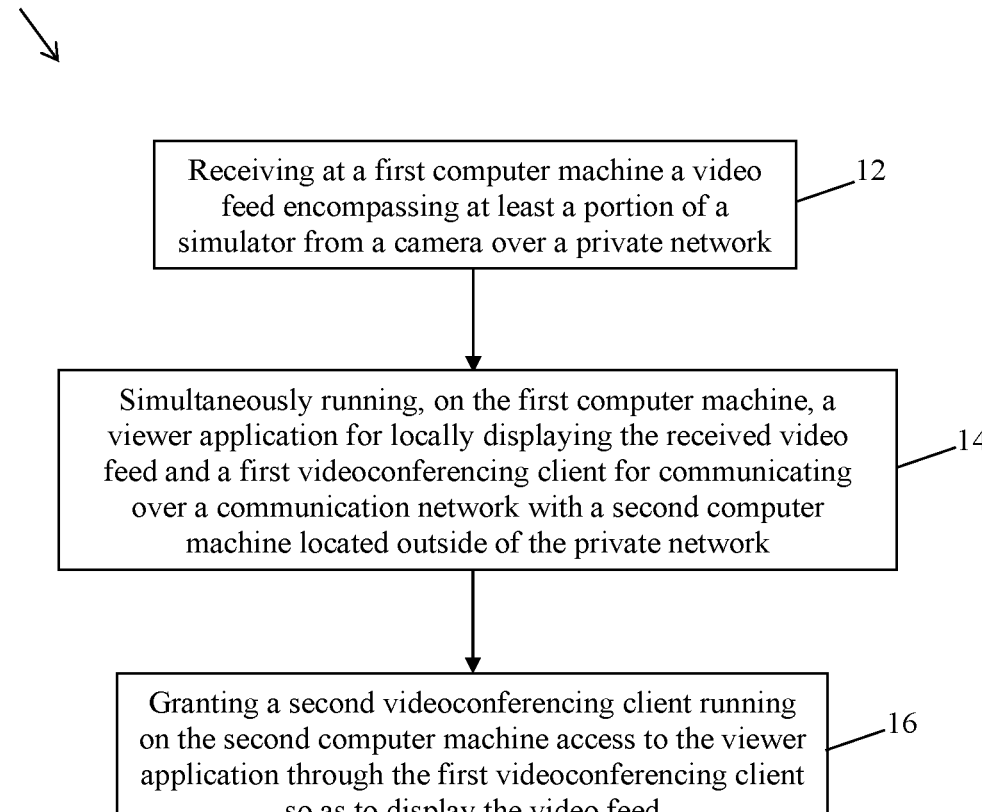
FIG. 1 is a flow chart illustrating a computer-implemented method for providing remote visibility into a simulation environment, in accordance with an embodiment.

FIG. 1 illustrates one embodiment of a method 10 for providing remote visibility into a simulation environment. It should be understood that the method 10 is executed by at least one processor. As described above, the simulation environment comprises at least instruments and controls at the disposal of a user such as a pilot during a simulation. The simulation environment is further provided with at least one camera positioned and oriented so as to capture at least a portion of the simulator such as at least a portion of the instruments and controls. The camera is connected to a first computer machine via a private network. The first computer machine is also connected to a second computer machine located outside the private network via a telecommunication network. The second computer machine does not have access to the private network. The first and second computer machines communicate via a videoconferencing platform using the telecommunication network.

At step 12, the first computer machine receives a first video feed from the camera over the private network. The first video feed encompasses at least a first portion of the simulator, i.e., the camera captures images of at least a portion of the interior space of the simulator, and the captured images are transmitted to the first computer machine. For example, the camera may be positioned behind the seats of the pilot and copilot so that the video feed may encompass the pilot, the copilot and a portion of the cockpit.

At step 14, a viewer application and a first videoconferencing client are running simultaneously on the first computer machine. The first computer machine comprises a first display unit and the viewer application is configured for displaying the video feed received at step 12 on the first display unit. For example, the viewer application may be configured for generating an interface for displaying at least one video feed therein and/or formatting the video feeds so that they may be displayed on the first display unit connected to the first computer machine. The first videoconferencing client is configured for transmitting and receiving data with a second videoconferencing client via the telecommunication network.

In one embodiment, the first computer machine further receives at step 12 a simulation control interface, a computer-generated representation of a second portion of the simulator and/or a second live camera feed captured by a second camera and encompassing a portion of the simulator different from the portion of the simulator encompassed by the first video feed. In this case, at step 14, the simulation control interface, the computer-generated representation of the second portion of the simulator and/or the second live camera feed is displayed within the viewer application in addition to the first video feed.

It should be understood that the viewer application is configured for displaying images such as a video feed or any image. In one embodiment, the viewer application is capable of handling various graphics file formats. In one embodiment, the viewer application is configured for rendering images according to properties of a display such as color depth, display resolution, and color profile.

At step 16, the second videoconferencing client running on the second computer machine is granted access to the viewer application through the first videoconferencing client running on the first computer machine. As a result, the video feed is transmitted by the first videoconferencing client to the second videoconferencing client via the telecommunication network. As a result, the same images displayed on the first display unit connected to the first computer machine may be remotely displayed on a second display unit connected to the second computer machine, and the third party may have remote visibility into the simulation environment while using a videoconferencing platform.

In one embodiment, the method 10 further comprises a step of establishing over the secure public network a connection between the first videoconferencing client running on the first computer and the second videoconferencing client running on the second computer.

In one embodiment, the first and second videoconferencing clients are part of an off-the-shelf videoconferencing platform configured for at least transmitting a video feed between computer machines participating in a videoconference session. For example, the off-the-shelf videoconferencing platform may be Teams™, Webex™, Google Meet™ or the like.

It should be understood that the position and orientation of the camera relative to the simulator are chosen as a function of a desired view of the simulator. As described above, the camera may be located within the simulator. In this case, the position and orientation of the camera may be chosen so as to capture at least the pilot and a portion of the cockpit. In another example, the position and orientation of the camera may be chosen so as to capture a given section or portion of the cockpit only. In a further embodiment, the camera may be positioned outside of the simulator so as to capture the exterior of the simulator in order to allow the third party to see the motion of the simulator.

In one embodiment, the position and orientation of the camera are fixed in time. In another embodiment, the position and/or orientation of the camera may change relative to the simulator so that different views of the simulator may be captured. In this case, the position and/or orientation of the camera may be controlled by the first computer machine.

While the above description refers to a single camera for capturing images of the simulator, it should be understood that a plurality of cameras may be used for capturing images of the simulator. For example, several cameras may be installed within the simulator to capture different views of the interior space of the simulator. In this case, the position and orientation of each camera installed within the simulator are chosen as a function a respective desired view of the interior space of the simulator. For example, a first camera may be positioned and oriented for capturing images of a pilot, a copilot and the cockpit, a second camera may be positioned and oriented for capturing images of a given portion of the cockpit. At least one further camera may be installed outside of the simulator so as to capture images of at least an external portion of the simulator.

When several views of the simulator are captured by several cameras, step 12 comprises receiving at the first computer machine the video feeds from the cameras over the private network. In one embodiment, the viewer application is configured for selecting a given one of the received video feed and providing the selected video feed for display on the first display unit connected to the first computer machine. In another embodiment, the viewer application is configured for selecting at least two of the received video feeds, generating an image comprising the two selected video feeds and providing the generated image for display on the first display unit connected to the first computer machine. For example, a first video feed encompassing an internal portion of the simulator and a second video feed encompassing an external portion of the simulator may be received at step 12. Then at step 14, the viewer application generates an image that comprises a first image from the first video feed and a second image from the second video feed. For example, half of the generated image may correspond to an image of the first video feed while the other half of the generated image may correspond to an image of the second video feed. For example, the images from the two video feeds may be positioned side-by side within the generated image, one on top of the other, or the like. The images generated by the viewer application are then transmitted to the first display unit to be displayed thereon. Furthermore and simultaneously to the display of the generated images on the first display unit connected to the first computer machine, the generated images are transmitted by the first videoconferencing client to the second videoconferencing client via the telecommunication network so that the display of the generated images on the first display unit connected to the first computer machine and the display of the same generated images on the second display unit connected to the second computer machine occur substantially concurrently.

For example, an image generated by the viewer application from three video feeds may comprise three sections in which a respective video feed is integrated. The top left section of the generated image may be used for displaying a first video feed captured by a first camera and encompassing the pilot, the copilot and the instrument and control panel. The right top section of the generated image may be used for displaying a second video feed captured by a second camera and encompassing a portion of the instrument and control panel. The bottom left section of the generated image may be used for displaying a third video feed captured by a third camera and encompassing a display unit present in the simulator for displaying a simulation image, e.g., a computer-generated image of the external environment of the aircraft as it would be seen through a window of a real aircraft.

Figure 2:
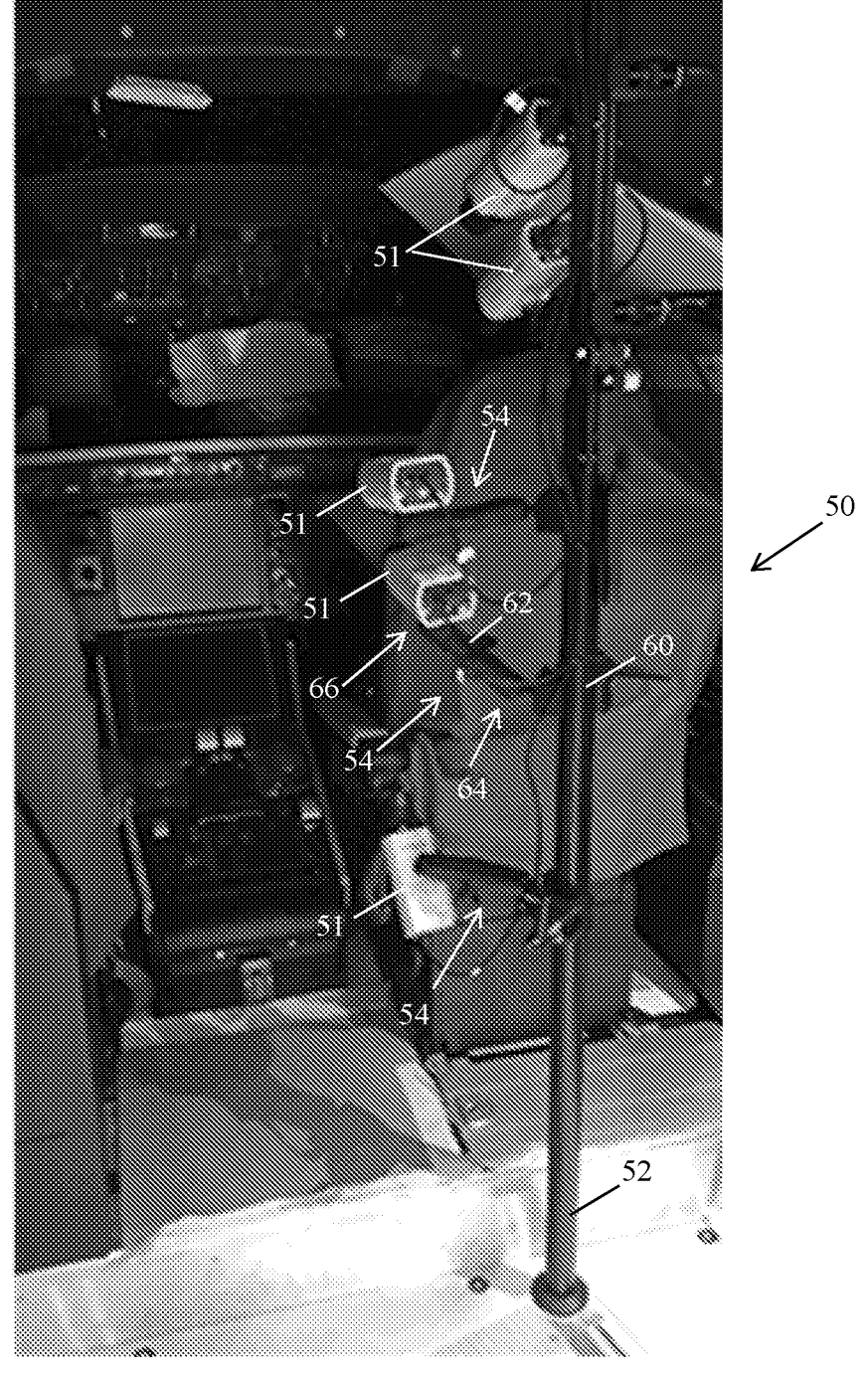
FIG. 2 is an image of an exemplary pole installed within a cockpit, the pole having a plurality of cameras mounted thereto to capture images of different portions of the cockpit.

FIG. 2 illustrates an exemplary pole 50 that may be used for removably installing a plurality of cameras 51 within the cockpit of a simulator. The pole 50 comprises an elongated body 52 extending longitudinally between a first end adapted to abut the floor of the cockpit and a second end adapted to abut the ceiling of the cockpit. The length of the elongated body 52 is adjustable to accommodate cockpits having different heights. For example, the elongated body 52 may be telescopic. In one embodiment, a respective rubber pad is mounted at the first and second ends of the elongated body 52 to improve the securing of the pole 50 to the cockpit. It should be understood that the elongated body 52 may have any adequate shape. For example, the elongated body 52 may have a circular cross-section, a square cross-section, etc.

The pole 50 further comprises a plurality of camera holding devices 54 each mountable at a respective position along the length of the elongated body 52 and configured for having a respective one of the cameras 51 secured thereto. Each camera holding device 54 comprises a clamp 60 mountable to the pole 50, an arm 62 extending between a first end 64 rotatably secured to the clamp 60 and a second end 66 rotatably securable to a respective one of the cameras 51. Once it is mounted to the second end 66 of the arm 62, the respective one of the cameras 51 is then rotatable relative to the arm 62. In one embodiment, the clamp 60 is slidably mounted to the elongated body 52.

In one embodiment, a first ball joint is connected between the first end 64 of the arm 62 and the clamp 62 to provide a rotation of the arm 62 about three rotational axes relative to the clamp 60. Similarly, a second ball joint is present at the second end 66 of the arm 62 to secure the camera to the arm 62 and provide a rotation of the camera about three rotational axes relative to the arm 62.

In order to mount the pole 50 to the cockpit, the length of the elongated body 52 is adjusted to correspond to the height of the cockpit, i.e., to the distance between the ceiling and the floor of the cockpit. The pole 50 is then positioned so that its first end abuts the floor of the cockpit at a desired position on the floor and its second end abuts the ceiling of the cockpit. Since the length of the pole 50 is substantially equal to the distance between the floor and the ceiling of the cockpit, compression forces exist between the pole 50 and the floor and ceiling of the cockpit, thereby allowing the securing of the pole 50 to the cockpit. It should be understood that the pole 50 extends substantially vertically when secured to the cockpit.

Once the pole 50 is secured to the cockpit at the desired position on the floor, each of the camera holding devices 54 is positioned at a respective desired longitudinal position along the elongated body 52. Once at the desired longitudinal position, the clamp 60 is used to fixedly secure a respective one of the camera holding devices 54 to the elongated body 52. A respective one of the cameras 51 is then secured to each camera holding device 54. Alternatively, the cameras 51 may be secured to the camera holding devices 54 before the positioning of the camera holding devices 54 at their desired longitudinal position.

Then, each of the cameras 51 is oriented so as to capture images of a respective desired view of the cockpit by rotating each of the respective cameras 51 relative to its corresponding arm 62 and/or rotating its corresponding arm 62 relative to its corresponding clamp 60.

In an embodiment in which the elongated body 52 has a cylindrical shape, the clamp 60 is further rotatable about the longitudinal axis of the elongated body 52. In this case, a clamp 60 can be positioned at a desired radial position along the circumference of the elongated body 52 before securing the clamp to the elongated body in order to adequately orient a respective one of the cameras 51.

It should be understood that the pole 50 may be removably secured within the cockpit at any adequate position that allows the capture of the desired views of the cockpit by the cameras 51. In one embodiment, the pole 50 is secured at an adequate position within the cockpit which allows the pilot and copilot to access their respective seat and/or easily leave the cockpit in case of emergency.

In one embodiment, the pole 50 is secured within the simulated area of the cockpit. For example, the pole 50 may be secured in front of the center pedestal of the cockpit such as between the seats of the pilot and copilot. In another example, the pole 50 is secured aft of the pilot and copilot seats while facing the center pedestal.

In one embodiment, the pole 50 is mounted at a position within the cockpit so that the distance between each of the cameras 51 mounted to the pole 50 and its respective portion of the cockpit to be imaged is comprised between about four feet and about six feet.

It should be understood that the number of the camera holding devices 54, and therefore the number of cameras 51, may vary as long as the pole 50 comprises at least one of the camera holding devices 54. In one embodiment, the pole 50 comprises at least three of the camera holding devices 54. In this case, a first of the camera holding devices 54 may be configured so that one of the cameras 51 is mounted thereto to provide a first video feed encompassing the center pedestal of the cockpit. A second of the camera holding devices 54 may be configured so that one of the cameras 51 is mounted thereto to provide a second video feed encompassing the overhead instrument panel. A third of the camera holding devices 54 may be configured so that one of the cameras 51 is mounted thereto to provide a third video feed encompassing the pilot instrument panel. Additional ones of the camera holding devices 54 may be provided so that additional ones of the cameras 51 provide video feeds of other portions of the cockpit such as video feeds encompassing the copilot instrument panel, the pilot once in his seat, the copilot once in his seat, a display unit, etc.

In some embodiments, the method 10 further provides remote access to a simulation control interface of the simulator such as the interface of the instructor operating station. The simulation control interface of the operating system provides for exchanging data with the simulation engine that generates the simulation. For example, the simulation control interface may be used to set and display parameters for the simulation. In one embodiment, the first computer machine is in communication with the simulation engine over the private network and the simulation engine directly transmits the simulation control interface to the viewer application. The viewer application combines the simulation control interface with the video feed received from the camera to display images comprising both the video feed and the simulation control interface on the first display unit. For example, two side-by-side section of the generated images may be used for respectively displaying the simulation control interface and the video feed.

While as described above the interface of the operating system may be received by the viewer application directly from the simulation engine, other embodiments are possible. For example, the simulation control interface may be displayed on a further display unit separate from the first display unit, e.g. on a display unit comprised on the instructor station within the simulator, and a camera captures images of the further display unit to provide a video feed encompassing the control interface. The video feed encompassing the simulation control interface is then transmitted to the viewer application which generates images using the video feed encompassing the simulation control interface and the video feed encompassing a portion of the simulator.

In one embodiment, images generated by the simulation engine may also be transmitted to the first computer machine so that the viewer application combines them with at least one video feed and optionally the interface of the operating system.

In one embodiment, the first computer machine is connected to a server hosting a data analytics platform over the private network. The data analytics platform stores historical interactions of users with the second computer machine, such as the amount of time the user spends on a given view, the location of user clicks on the image displayed on the second display unit, etc. In this case, the method 10 further provides remote access to the interface of the data analytics platform.

In this embodiment, the first computer machine directly transmits the interface of the data analytics platform to the viewer application. The viewer application combines the interface of the data analytics platform with the video feed received from the camera to display images comprising both the video feed and the interface of the data analytics platform on the first display unit.

While as described above the interface of the data analytics platform may be received by the viewer application directly from the server hosting the data analytics platform, other embodiments are possible. For example, the interface of the data analytics platform may be displayed on a further display unit separate from the first display unit, and a further camera may capture images of the further display unit to provide a video feed encompassing the interface of the data analytics platform. The video feed encompassing the interface of the data analytics platform is then transmitted to the viewer application which generates images using the video feed encompassing the interface of the data analytics platform and the video feed encompassing a portion of the simulator.

Figure 3:
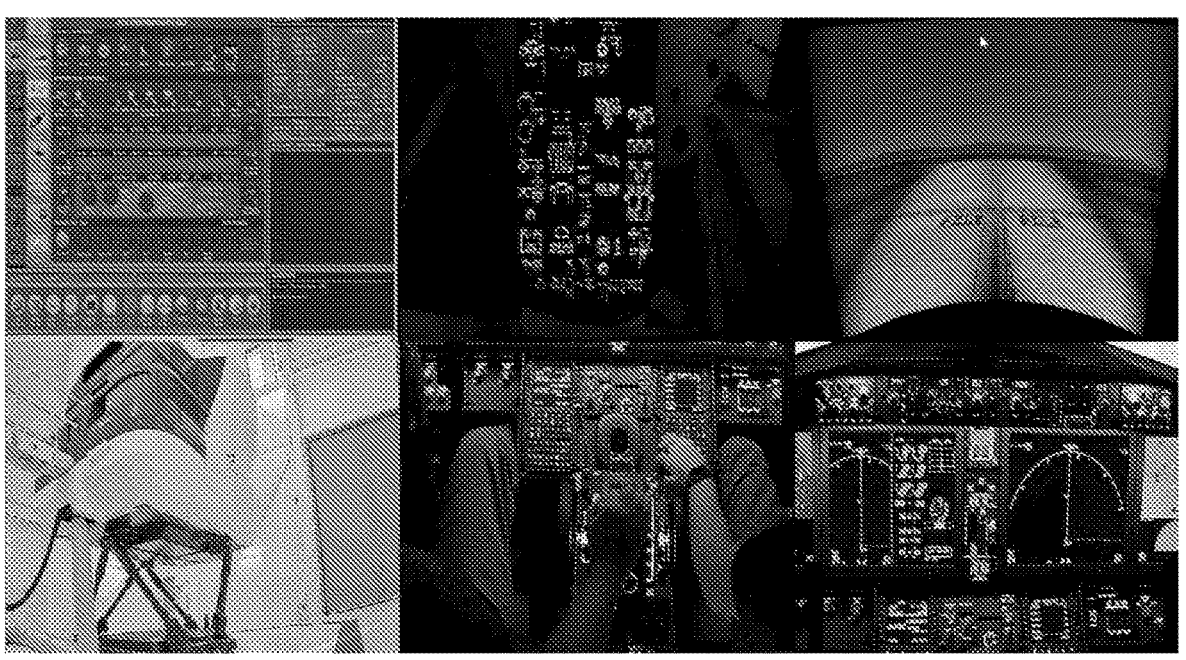
FIG. 3 is an exemplary image generated by a viewer application and comprising six sections.

FIG. 3 illustrates an exemplary image resulting from the combination of six different images or video feeds performed by the viewer application. The illustrated image is split into six even sections and each section is used for displaying thereon a respective image or video feed. On the top right, an image of the interface of the instructor operating system is displayed. At top center, a video feed encompassing the upper portion of the simulator is displayed. At the top right, a simulated image of the external environment of an aircraft is displayed. At the bottom left, a video feed encompassing an external portion of the simulator is displayed. At the bottom center, a video feed encompassing a first portion of the cockpit is displayed. At the bottom right, a video feed encompassing a second portion of the cockpit is displayed.

Figure 4:
FIG. 4 illustrates an exemplary videoconferencing client interface in which the image of FIG. 3 is displayed.

The image illustrated in FIG. 3 is transmitted by the first videoconferencing client to the second videoconferencing client over the telecommunication network. FIG. 4 illustrates an exemplary interface of the second videoconferencing client displayed on the second display unit of the second computer machine. The illustrated interface comprises the image generated by the viewer application and transmitted to the second videoconferencing client and further comprises icons each corresponding to a respective participant in a videoconference session below the image.

For example, an image generated by the viewer application may combine seven video feeds and a simulated image. The image generated by the viewer application may be split into four sections. The top left section may be used for displaying six different video feeds each encompassing a respective portion of the simulator. The top right section of the image may be used for displaying a video feed encompassing a portion of the panel of commands and controls. The bottom right of the image may be used for displaying a simulated map with the aircraft position overlaid. The bottom left of the image may be used for displaying an enlarged version of one of the six images displayed at the top left. For example, by double clicking on one of the six video feeds displayed at the top left, the selected video feed is enlarged and displayed on the bottom left section.

In one embodiment, the method 10 further comprises transmitting audio signals between the first and second videoconferencing clients over the telecommunication network. In one embodiment, at least one microphone and/or at least one speaker may be present within the simulator for capturing sound and/or emitting audio signals. The microphone and the speaker are in communication with the first computer machine. For example, the microphone and the speaker may be connected to the first computer machine over the private network. In another example, Bluetooth communication may be used between the first computer machine and the microphone and/or the speaker.

When a microphone is located within the simulator, the microphone captures the sounds emitted within the simulator and an audio feed is transmitted by the microphone to the first computer machine. The received audio feed is then transmitted to the second videoconferencing client by the first videoconferencing client over the telecommunication network during the videoconference session. It should be understood that the second computer machine is provided with at least one speaker to playback the received audio feed so that the third party may hear the sounds generated within the simulator.

Similarly, the second computer machine may be provided with a microphone for capturing audio and the corresponding audio feed is then transmitted by the second videoconferencing client to the first videoconferencing client via the telecommunication network. The first computer machine then receives the audio feed from the second computer machine and transmits the audio feed to the speaker present in the simulator.

Hence, audio communication may be established in substantially real time between the pilot and/or copilot present in the simulator and the third party remotely located via the videoconference session. The third party may send vocal instructions or comments to the pilot and the copilot while hearing any discussion between the pilot and the copilot in addition to hearing the noise within the simulator.

In one embodiment, the pilot and the copilot are each provided with a respective headset connected to the first computer machine. In another embodiment, at least one microphone may be secured within the internal portion of the simulator such as between the pilot and the copilot to capture audio within the simulator, and at least one speaker may be secured within the internal portion of the simulator.

In one embodiment, a visual communication between the third party and the pilot may also be provided by the present method 10. For example, the third party may input commands/requests/instructions, such as text, an image, a drawing or the like, into the second computer device. The command is transmitted by the second videoconferencing client to the first videoconferencing client over the telecommunication network. Upon reception of the command, the first computer machine transmits the received command to a display unit located within the simulator so as to inform the pilot and/or copilot of the command. For example, the command may be displayed on a display unit contained in the instrument and control panel of the simulator. In another embodiment, the display unit may comprise a projector configured for projecting the command within the simulator for informing the pilot and/or copilot.

In one embodiment, the viewer application running on the first computer machine may be remotely controlled by the second computer machine via the videoconference platform. In this case, the method 10 further comprises a step of granting the second videoconferencing client control over the viewer application via the first videoconferencing client. In this case, the third party may enter a command within the second videoconferencing client. Doing so, the third party may interact with the interface of the instructor operator station of the simulator for example. When an input is entered into the second videoconferencing client of the second computer machine, the input is transmitted by the second videoconferencing client to the first videoconferencing client over the telecommunication network. The input is then received by the viewer application which is configured for executing the command. For example, when it detects a mouse click, the second videoconferencing client may determine the position of the cursor within the image displayed by the second videoconferencing client. The second videoconferencing client then transmits the cursor position to the first videoconferencing client which transmits the received cursor position to the viewer application. The viewer application interprets the received cursor position as a mouse click at the same position within the image generated by the viewer application. For example, if the cursor position corresponds to button on the interface of the instructor operator station, the viewer activates the button, i.e. it sends a command indicative that the identified button must be activated to the simulation engine. The third party may interact with the interface of the data analytics platform.

In one embodiment in which the first and second videoconferencing clients are part of an off-the-shelf videoconferencing platform, existing functions such as "Give control" and "Take control" may be used for granting the second videoconferencing client control over the viewer application. Control of the interface of the operating system and/or the interface of the data analytics platform can then be granted to the second videoconferencing client.

It should be understood that the above-described method 10 may be embodied as a system for providing remote visibility into a simulation environment, the system comprising at least one processor and a non-transitory storage medium operatively connected to the processor, the non-transitory storage medium comprising computer readable instructions, the processor, upon executing the computer readable instructions, being configured for executing the steps of the method 10.

It should also be understood that the above-described method 10 may be embodied as a computer program product for providing remote visibility into a simulation environment, the computer program product comprising a computer readable memory storing computer executable instructions thereon that when executed by a processor perform the method steps of the method 10.

Figure 5:
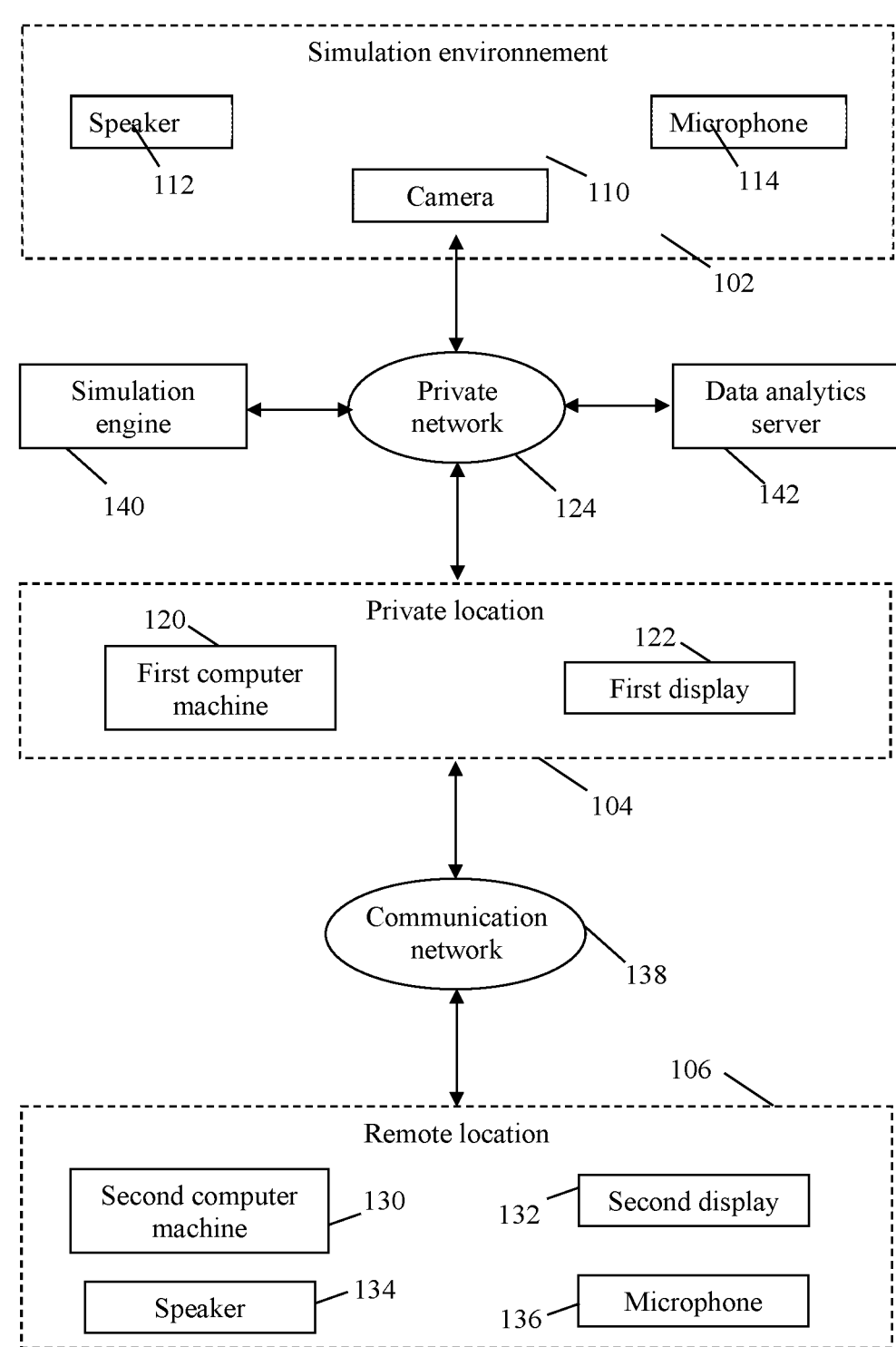
FIG. 5 is a block diagram illustrating a system for providing remote visibility into a simulation environment, in accordance with an embodiment.

FIG. 5 illustrates one embodiment of a system 100 for providing remote visibility into a simulation environment. The system 100 may be used for executing the method 10.

The system 100 comprises a simulation environment or simulator 102, a private location 102 and a remote location 104. The simulator 102 comprises at least instruments and controls (not shown) with which a user of the simulator 102 interacts to perform a simulation, at least one camera 110 for capturing images of at least a portion of the simulator 102 such as at least a portion of the instruments and controls, at least one speaker 112 positioned within the simulator 102 and at least one microphone 104 positioned within the simulator 102.

The private location 104 comprises a first computer machine 120 and a first display unit 122 connected thereto. A viewer application and a first videoconferencing client are simultaneously running on the first computer machine. The first computer machine 120 is in communication with the camera 110, the speaker 112 and the microphone 114 of the simulator 102. The camera 110 is connected to the computer machine 120 via a private network. In one embodiment, the speaker 112 and the microphone 114 are also connected to the computer machine 120 via the private network. In another embodiment, wireless communication such as Bluetooth communication may be used for connecting the first computer machine and the speaker 112 and the microphone 114 as described above. In this case, it should be understood that the private location 122 is located in close proximity with the simulator so as allow wireless communication between the speaker 112 and the microphone 114, and the first computer machine 120.

The remote location comprises a second computer machine 130, a second display unit 132, a speaker 134 and a microphone 136. A second videoconferencing client is running on the second computer machine 130. Data may be exchanged between the first videoconferencing client running on the first computer machine 120 and the second videoconferencing client running on the second computer machine 130 via a telecommunication network 138. It should be understood that the second computer machine 130 does not have access to the private network 124.

As described above, the viewer application miming on the first computer machine 120 receives the video feed from the camera 110 over the private network 124 and provides the video feed for display on the first display unit 122. Furthermore, the viewer application transmits the video feed to the first videoconferencing client which transits the video feed to the second videoconferencing client over the telecommunication network 138.

The second videoconferencing client running on the second computer machine 130 receives the video feed form the first videoconferencing client and transmits the received video feed for display on the second display unit 132.

The speaker 112 and the microphone 114, and the speaker 134 and the microphone 136 allows audio communication between the simulator environment 102 and the remote location 106, as described above. Any audio signal captured by the microphone 114 is transmitted to the first computer machine 1210 and subsequently transmitted to the second computer machine 130 via the first and second videoconferencing clients and over the telecommunication network 138. The audio signal is then played back by the speaker 134. Similarly, any audio signal captured by the microphone 136 is transmitted to the first computer machine 120 via the first and second videoconferencing clients over the telecommunication network 138. The first computer machine 120 then transmits the received audio signal to the speaker 112 which plays back the audio signal.

In one embodiment, the system 100 further comprises the simulation engine 140 that generates the simulation for the simulator 102. The simulation engine 140 is in communication with the first computer machine 120 via the private network 124. The simulation engine 140 is configured for transmitting the interface of the operating system to the first computer machine 120 over the private network 124. The viewer application running on the first computer machine 120 receives the interface of the simulation engine 140 and generates an image comprising the video feed received from the camera 110 and the interface of the operating system. The viewer application then transmits the generated image to the first display unit 122 to be displayed thereon and to the first videoconferencing client which transmits the image to the second videoconferencing client, as described above.

In one embodiment, the system 100 further comprises a data analytics platform hosted on a server 142 connected to the private network. The server 142 is configured for transmitting the interface of the data analytics platform to the first computer machine 120 over the private network 124. The viewer application running on the first computer machine 120 receives the interface of the data analytics platform and generates an image comprising the video feed received from the camera 110 and the interface of the data analytics platform. The viewer application then transmits the generated image to the first display unit 122 to be displayed thereon and to the first videoconferencing client which transmits the image to the second videoconferencing client, as described above.

As described above, commands/requests may be transmitted from the second computer machine 130 to the first computer machine 120 via the first and second videoconferencing clients over the telecommunication network 138. For example, predefined inputs inputted in the second computer machine 130 may be recognized as commands and transmitted to the view application of the first computer machine 120. For example, a mouse click or the actuation of a given key of the user interface connected to the second computer machine 130 may be identified as a command. In this case, the second videoconferencing client transmits the command to the first videoconferencing client and the viewer application executes the command.

As described above, in an embodiment in which the first and second videoconferencing clients are part of an off-the-shelf videoconferencing platform, the control of the viewer application may be granted to the second computer device by using predefined functions of the off-the-shelf videoconferencing platform.

FIG. 6 illustrates an exemplary cockpit of an aircraft simulator. The simulator comprises:

a main instrument panel comprising a pilot instrument panel and a copilot instrument panel;

a center pedestal positioned between the seats of the pilot and copilot;

an overhead instrument panel;

at least one display unit for displaying simulation images thereon;

two front cameras positioned in front of the pilot and copilot and each oriented so as to capture images to the pilot or the copilot;

three rear cameras positioned behind the pilot and copilot and each oriented so as to image the pilot instrument panel, the copilot instrument panel and the full view of the cockpit;

an upward facing camera positioned and oriented for imaging the overhead instrument panel;

a downward facing camera positioned and oriented for imaging the center pedestal;

an external camera for imaging an external portion of the simulator;

two projectors positioned behind the pilot and copilot for displaying images within the cockpit;

two microphones each positioned on opposite sides on the main instrument panel;

a central microphone positioned on the pedestal;

two speakers each positioned on opposite sides on the main instrument panel; and a central speaker positioned on the pedestal.

All of the cameras, the microphones and the speakers, and the projectors are in communication with the first computer machine. The video feeds captured by the cameras are received by the viewer application which generates images combining the received video feeds, and the generated images are transmitted to the second videoconferencing client by the first videoconferencing client and to the first display unit. The audio feeds received from the microphone are also transmitted to the second videoconferencing client by the first videoconferencing client. Any audio feed received by the first videoconferencing client from the second videoconferencing client are transmitted to the speakers to be played back. Any visual instruction such as text or images received by the first videoconferencing client from the second videoconferencing client is transmitted to at least one of the two projectors to be displayed within the cockpit. As will be described in greater detail below, the projectors may be used for displaying images on the different instrument panels to point at a particular instrument.

In one embodiment, the pilot and the copilot may be each provided with a headset connected to the first computer machine. In this case, the above-described speakers and microphones may be omitted.

It should be understood that some of the components of the simulator illustrated in FIG. 6 may be omitted or other components may be added. Similarly, the position and orientation of the components should be understood to be exemplary only.

Figure 7:
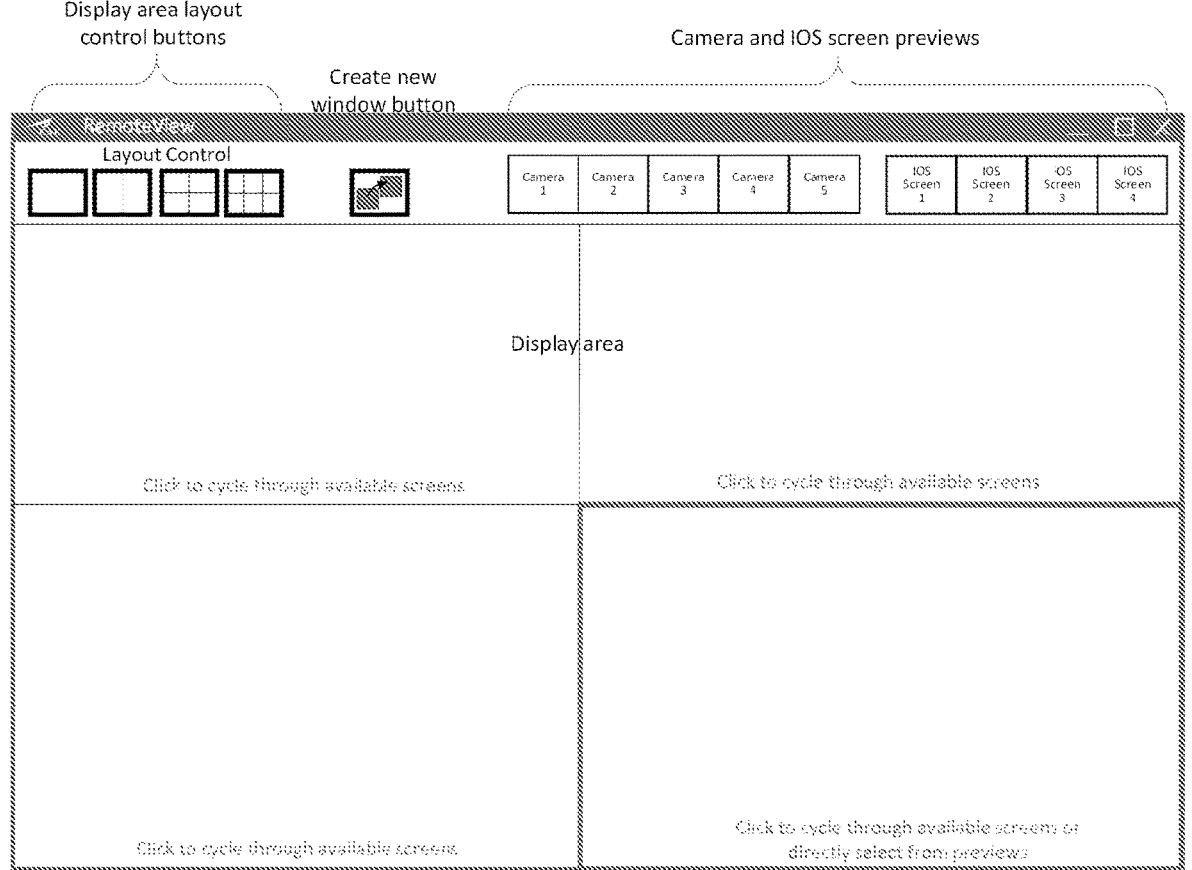
FIG. 7 is a conceptual diagram illustrating an interface for concurrently displaying four different images, in accordance with an embodiment.

FIG. 7 illustrates an exemplary visual interface generated by the second videoconferencing client. Using this interface, the user of the second computer machine may select the video feeds and images of interfaces that he wants to see. At the top left of the visual interface, the user may select the layout of the displayed images. For example, the user may select to display a single video feed or interface image, two different video feeds or interface images located side-by-side, four video feeds or interface images or six video feeds or interface images.

The top control bar also contains boxes indicating which video feeds and interface images are available. In the present example, five different video feeds and four different interface images are available. Since in the illustrated example, the layout comprises four windows, the user may select four items from the available video feeds and interface images to be displayed each in a respective window.

Figure 8:
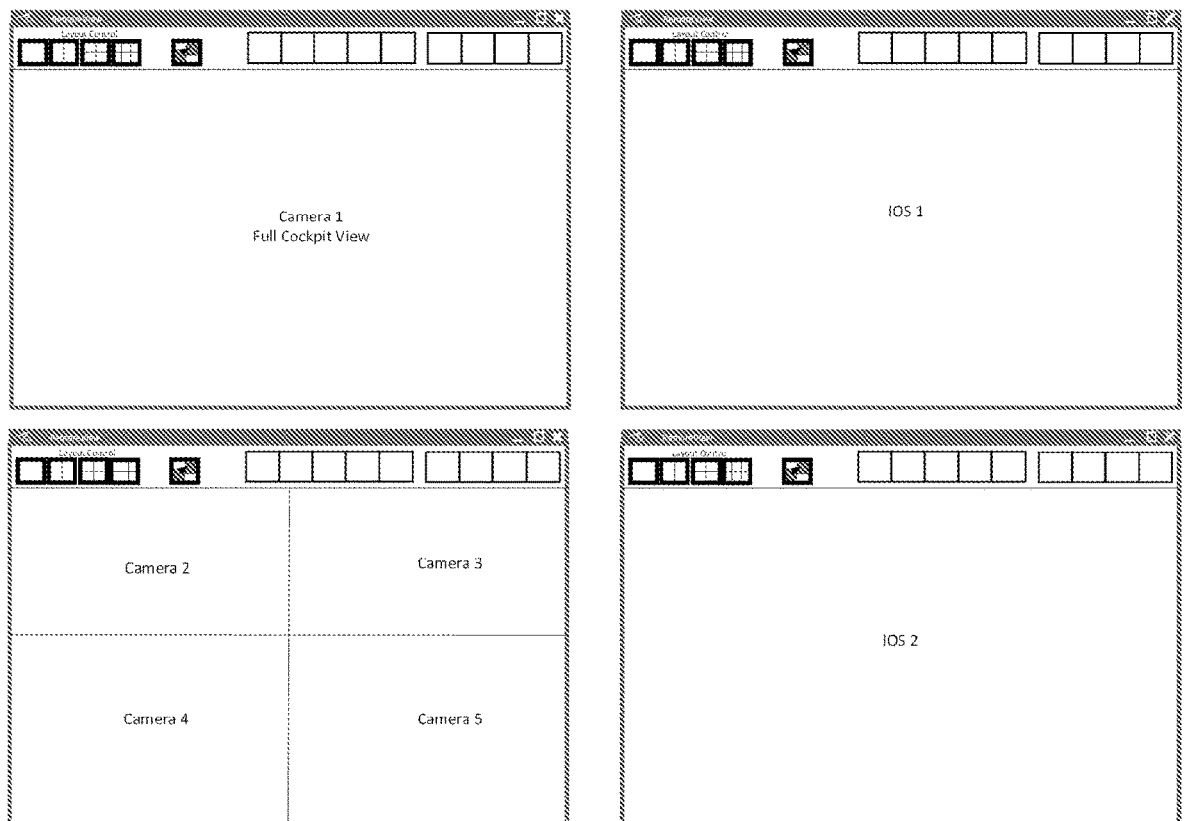
FIG. 8 is a conceptual diagram illustrating four interfaces each to be displayed on a respective display unit, in accordance with an embodiment.

FIG. 8 illustrates an exemplary set-up when four display units are connected to the second computer machine. In this embodiment, the same visual interface is provided by the second videoconferencing client for each display unit. The user may select different layout for different display units. In the illustrated embodiment, three display units display an interface which comprises a single window each for displaying a single video feed or a single interface while the fourth display unit displays an interface comprising four windows for displaying four different video feeds or interfaces therein.

It should be understood that while they are described in the context of a flight simulator or aircraft simulator, the above method and system may be used for other type of simulators.

In an embodiment in which the simulator is already provided with integrated cameras, microphones and speakers, the already present cameras, microphones, and speakers may be used for implementing the present technology.

In one embodiment, the camera used for imaging at least a portion of the simulator is an Internet Protocol (IP) camera to accommodate the streaming the captured images. In one embodiment, the camera is a color camera with low-light sensitivity. In one embodiment, the camera is provided with a zoom for adjusting its field of view. In this case, the field of view may be controlled from the first computer machine or the second computer machine. In one embodiment, the cameras is capable of being mounted in a such a way that it does not move with buffets up to 3G. In one embodiment, the camera supports a minimum resolution of 1080p and 30 fps and/or supports RTSP (streaming protocol) and H.264 compression.

In one embodiment, the camera is a Panasonic™ WV-S1131. In another embodiment, the camera is a miniature camera such as an Axis camera. For example, a camera may be a pen camera or a pinhole camera having a wide field of view, such as superior to 90 deg and excellent low-light characteristics. Such a miniature camera may be used where a larger camera would get in the way or be too intrusive.

In one embodiment, the camera is mounted on custom-made or custom-assembled brackets that are specific to each cockpit to maximize the view while minimizing the level of intrusiveness. When it is a miniature camera, the camera may be mounted either in the main instrument panel (MIP) or in the glare shield control panel (GCP).

In one embodiment, a dedicated segment is created in the private network so as to prevent the operation of the present system from affecting the general operation of the simulator.

In one embodiment, a Virtual Private Network (VPN) is used to communicate with the simulator over a Wide Area Network (WAN). The VPN is a dedicated "profile" that allows for tunneling through the various network firewalls/routers/switches to ensure good performance. The password protection is provided via a standard VPN process. In one embodiment, there may be no encryption or VPN when running the system on a Local Area Network (LAN).

In one embodiment, the camera is connected to an onboard router to access the dedicated segment of the simulator network. The first computer machine connects to the segment to receive the video feed from the camera.

In one embodiment, the first computer machine has simultaneous access to the simulator network and the Internet to manage a two-way communication between the simulator and the second computer machine. The first computer machine serves as a bridge between the Internet and the simulator network that prevents the second computer machine from having direct access to the simulator network. The second computer machine may belong to client or a regulatory entity for example.

In one embodiment, the applications such as the viewer application run locally on the processor of the first computer machine, while the first videoconferencing client may at least partially run in the cloud. In another embodiment, the applications may run predominantly in the cloud.

In one embodiment, the first computer machine is located onboard, which enables a wired connection to a conferencing speaker. In one embodiment, the first computer machine can be co-located with the simulator, e.g., when the first computer machine is located adjacent to the simulator such as when the first computer machine and the simulator are located within the same building, or remote such as when the first computer machine and the simulator are located in different buildings.

It should be understood that the first and second computer machine may be any device provided with at least one processor, a memory and communication means. For example, the first or second computer machine may be a laptop, a desktop, a tablet, a smartphone or the like.

In one embodiment, the management of the audio within the above-described system takes into account the three following aspects:
  1) the cockpit ambient sounds that are created by the simulation, such as engine sounds, outside airflow, aerodynamic hiss, mechanical sounds like gear and flap extension, etc.
  2) radio communications simulating the conversations between air traffic control and aircrew for example; and
  3) crew-instructor communications that are a natural part of the instructional process.

In an embodiment in which the pilot and/or copilot is provided with a headset, the pilot or copilot hears comms and intercom through the headset and ambient sounds are generated by the simulator sound system. Pilot voices are captured by the headset microphones.

In an embodiment in which the pilot and/or copilot is provided with a headset, specialized microphones are installed at key locations along with extra speakers which may be connected to a digital signal processing system to eliminate echoes and ambient noise. The simulated aircraft sounds are generated by the simulator sound system.

In one embodiment, at least six different cameras are used for each capturing a respective one of the six following views:
  the pilot side main instrument panel;
  the copilot side main instrument panel;
  the center pedestal;
  the overhead panel;

a close-up of one of the primary flight displays
  a behind-the-shoulder view between the two pilots, similar the view that an instructor would have leaning forward from behind them. Such a view provides an overall wide-angle encompassing the instruments, outthe window visual and the pilots.

In one embodiment, cameras mounted unobtrusively in the main instrument panel facing backwards provide a view of the pilots' faces/reactions.

In one embodiment, the data analytics platform is hosted in the cloud. The analytics data can either be downloaded to the simulator for viewing such as to accommodate for instance simulators with limited internet connectivity, or viewed directly from the cloud.

In the following there is described a method and system for remotely operating at least one projector to point to a region of interest within a simulator. In one embodiment, the below-described method may be used along with the above-described system 100 to allow a user such as the above-described third party to remotely operate a projector to point to a region of interest within a simulator via a videoconferencing platform.

The below-described method and system attempt to reproduce part of the interaction that exists between an instructor and a pilot/copilot when the instructor is physically present within the simulator with the pilot/copilot. During such a training when the instructor is physically in the simulator, the instructor is usually required to point out specific aspects of aircraft systems operation and/or contents on one or more multi-function displays.

The traditional method adopted requires that the instructor moves forward towards the pilot/copilot or point from a seated position with seat belts fastened as a safety precaution for aircraft simulators equipped with motion systems. However, under some circumstances such as during a pandemic, it may be advantageous for the instructor to be remotely located, i.e., to be located outside of the simulator, to reduce contamination risks for example.

Figure 9:
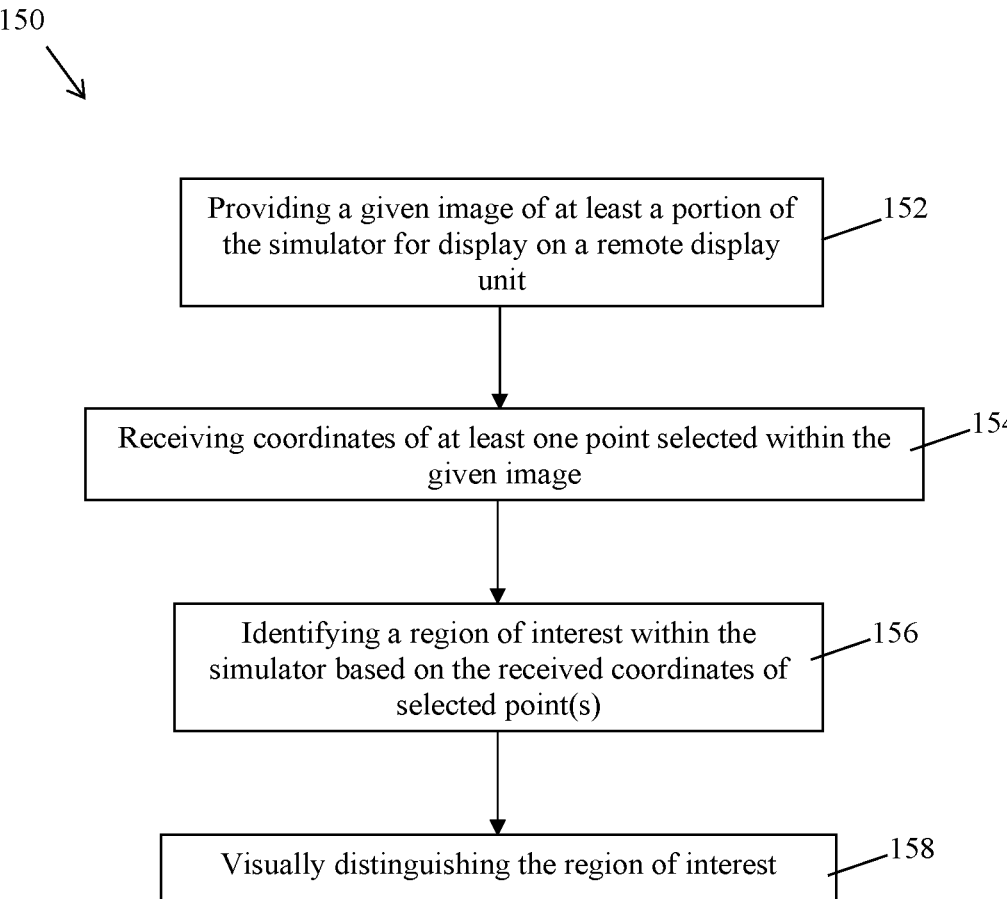
FIG. 9 is a flow chart illustrating a method for remotely illuminating a region of interest within a simulator, in accordance with an embodiment.

FIG. 9 illustrates one embodiment of a method 150 for remotely pointing to a region of interest within a simulator or simulation environment. It should be understood that the method 150 is executed by a computer machine provided with at least one processor, at least one memory and a communication interface. The method 150 allows a user such as an instructor who is not present within the simulator to visually interact with a person located within the simulator such as a pilot or a copilot by remotely pointing to a given region of interest within the simulator. As described below, the method 150 may be executed via a videoconferencing platform over a secure public network.

At step 152, an image of at least a portion of a simulator is provided by a first computer machine for display on a remotely located display unit. The image represents at least a portion of the interior of the simulator such as at least a portion of the cockpit, at least a portion of the instruments and controls, etc.

In one embodiment, the image is captured by at least one camera installed within the simulator. For example, a single camera movable within the simulator may be used for capturing a view of the interior of the simulator. In another example, a single camera having a fixed position and/or orientation may be used for capturing a view of the interior of the simulator. In a further example, a plurality of cameras each having a fixed position and orientation may be installed within the simulator. The image provided for display at step 150 may correspond to the image captured by a given camera. In another embodiment, the image may result from the combination of a plurality of images captured by a plurality of cameras. In this case, the method 150 further comprises a step of combining the plurality of images received from different cameras together to obtain a single image.

In another embodiment, the image provided for display at step 152 may be a simulated image or computer-generated image of at least a portion of the interior of the simulator. In one embodiment, the image may a three-dimensional (3D) image of at least a portion of the simulator. In this case, the method 150 further comprises a step of generating an image of at least a portion of the interior of the simulator.

The image is transmitted by a first computer machine to a second or remote computer machine located outside the simulator over a communication network. For example, the communication network may be a secure private network. In another example, the communication network may be a public network such as the Internet. The remote computer machine is connected to a user interface for inputting commands to the remote computer machine and a display unit for displaying thereon the received image of the simulator.

Once the received image of the simulator has been displayed, the user of the remote computer machine may select at least one point of the displayed image using any adequate user interface such as a mouse, a keyboard, a stylus when the display unit comprises a touchscreen, etc.

In one embodiment, a single point is selected on the displayed image of the simulator. In another embodiment, a plurality of points are selected by the user. The plurality of points may be discrete, i.e. the selected points may be spaced apart from one another. Alternatively, the points may be adjacent so to form a continuous geometrical shape such as a line, a circle, a square, etc.

It should be understood that any adequate method for selecting at least one point on an image may be used. For example, a mouse may be used for moving a cursor over a desired point and a right or left-click on the mouse may be used to create a click event and select the desired point or a key of a keyboard may be depressed to select the desired point. In another example, multiple points may be selected by right or left-clinking on a mouse while moving the mouse in order to move the cursor over the desired points. In a further example, the user of the remote computer machine may draw over the displayed image to select a point or a plurality of points.

The coordinates of the selected point(s) within the displayed image are captured by the remote computer machine and transmitted to the first computer machine over the communication network.

It should be understood that when the remotely displayed image is a 2D image, the captured coordinates are 2D coordinates and when the remotely displayed image is a 3D image, the captured coordinates are 3D coordinates.

At step 154, the position of the selected point(s) within the remotely displayed image is received, i.e., the coordinates of the selected point(s) are received by the first computer machine over the communication network.

In one embodiment, the first and remote computer machines are connected via a public secure network and the first computer machine is provided with a first videoconferencing client while the second computer machine is provided with a second videoconferencing client. In this case, the coordinates of the selected point(s) are transmitted through the second videoconferencing client to the first computer machine and are received by the first computer machine through the first videoconferencing client.

At step 156, a region of interest located on the simulator is identified based on the received coordinates of the selected point(s). For example, if the user of the remote computer machine selected a given button or actuator displayed on the image, the step 156 consists in identifying a region of interest on the simulator in which the selected button or actuator is contained.

In one embodiment, the identification of the region of interest is performed based on a mapping between the coordinate system of the remotely displayed image and the coordinate system of the simulator.

In one embodiment, the region of interest has a predefined shape and/or dimension. In this case, the step 156 comprises identifying the position of the region of interest on the simulator based on the received coordinates. For example, if coordinates of a single point are received at step 154, step 156 comprises identifying the position of the region of interest on the simulator based on the received coordinates of the single selected point and assigning a predefined shape and a predefined dimension to the region of interest. For example, the region of interest may have the shape of a square having a predefined side length.

In an embodiment in which the coordinates of more than one point are received, the relative size of the region of interest may be larger than that of the geometrical object formed by the selected point. For example, if the selected points form a circle having a given diameter, the region of interest may also have a circular shape and the diameter of the circular region of interest may be larger than that of the circle formed by the selected points.

In an embodiment in which coordinates of more than one selected point are received at step 154, the position for the region of interest is identified based on the coordinates of at least one of the selected points and the shape and dimension of the region of interest may be determined based on the coordinates of the selected points. For example, if the user of the second computer machine makes a drawing to select points, the region of interest may be provided with the same shape as that of the drawing and the dimension of the region of interest may be chosen based on the dimension of the drawing while the position of the region of interest within the simulator is identified based on the position of the drawing within the displayed image, i.e. based on the coordinates of at least one point of the drawing within the displayed image.

In one embodiment, a first coordinate system is assigned to the interior of the simulator and a second coordinate system is assigned to the displayed image. The position of the region of interest is determined using the received coordinates and a mapping between the first and second coordinate systems such as a transfer function between the first and second coordinate systems. The mapping between the coordinate systems allows for mapping a given point in the displayed image to a respective point within the simulator, i.e., for determining the coordinates of the respective point within the first coordinate system based on the coordinates of the given point within the second coordinate system.

In one embodiment, the method further comprises a step of calibration for determining the mapping between the first and second coordinate systems.

Once the position of the region of interest within the simulator has been identified at step 156, the region of interest of the simulator is visually distinguished at step 158, e.g., the region of interest is illuminated. It should be understood that any adequate method for visually distinguishing the region of interest may be used. The simulator may be provided with at least one light source connected to the first computer machine that controls the light source. For example, the simulator may be provided with a single light source of which the position and/or orientation is adjustable so as to illuminate the region of interest on the simulator. In another embodiment, the simulator may be provided with a plurality of light sources and the method further comprises a step of selecting a given light source to be operated so as to illuminate the region of interest based on the position of the region of interest. In an embodiment in which the simulator is provided with a plurality of light sources, the position and/or orientation of the light sources may be fixed. Alternatively, the position and/or orientation of at least one light source may be adjustable.

While using the method 150, a user such as an instructor may be located remotely from the simulator while still being capable to visually interact with a user of the simulator such as a pilot or a copilot. For example, by pointing a cursor at a given location on the displayed image of the simulator, the corresponding location within the simulator is illuminated, thereby allowing the instructor to visually indicate the location within the simulator of a control, command, button, or the like to be activated during a simulation. It should be understood that the method 150 is executed in substantially real-time so that any region or point selected on the displayed image is illuminated in the simulator in substantially real-time.

In one embodiment, the method 150 further allows the user of the second computer machine to talk to the user(s) of the simulator. In this case, the second computer machine is connected to a microphone and the simulator is provided with at least one speaker. Alternatively, the user(s) of the simulator may be provided with a headset. The user of the second computer machine may then talk into the microphone and the generated live audio feed is transmitted to the first computer machine. In an embodiment in which the first and second computer machines are connected via a videoconferencing platform, the live audio feed is transmitted by the second computer machine through the second videoconferencing client and received by the first computer machine through the first videoconferencing client. The first computer machine then transmits the received live audio feed to the speaker which plays back the audio feed in substantially real-time.

FIG. 10 illustrates a further embodiment of a method 200 for remotely pointing to a region of interest within a simulator. The method 200 corresponds to a particular implementation of the method 150, in which a projector is used for illuminating a region of interest within a simulator.

At step 202 and similarly to step 152, an image of at least a portion of a simulator is provided by a first computer machine to a second computer machine for remote display, as described above.

At step 204 and similarly to step 154, coordinates at least one point selected in the displayed image are received by the first computer machine, as described above.

At step 206, the received coordinates are mapped to a pointer area within the field of view of the projector. The pointer area corresponds to a portion of the field of view of the projector and is defined by a position within the filed of view of the projector, a shape and a size. At step 206, the position of the pointer area within the field of view of the projector is determined based on the received coordinates.

In one embodiment and as described above with respect to the method 150, the pointer area has a predefined shape and/or dimension.

In an embodiment in which coordinates of more than one selected point are received at step 204 and as described above with respect the method 150, the position of the pointer area within the field of view of the projector is identified based on the coordinates of at least one of the selected points and the shape and dimension of the region of interest may be determined based on the coordinates of the selected points.

In one embodiment, a first coordinate system is assigned to the projector or the field of view of the projector and a second coordinate system is assigned to the displayed image. The position of the pointer area within the first coordinate system is determined based on the received coordinates using a mapping between the first and second coordinate systems such as a transfer function between the first and second coordinate systems. The mapping between the coordinate systems allows determining the coordinates of the respective point within the first coordinate system based on the coordinates of the given point within the second coordinate system. The position of the pointer area within the field of view of the projector is then chosen based on the position of the point(s) within the first coordinate system that correspond to the selected point.

In one embodiment, the coordinate system of the projector is mapped to the coordinate system of the simulator so that at least one given point within the coordinate system of the simulator that correspond to the selected point(s) within the displayed image is first determined using the mapping between the coordinate systems of the simulator and the displayed image. The location of the pointer area within the coordinate system of the projector is then identified by mapping the identified given point within the coordinate system of the simulator into the coordinate system of the projector.

In one embodiment, the method further comprises a step of calibration for determining the mapping between the first and second coordinate systems.

In an embodiment in which the displayed image corresponds to the portion of the simulator encompassed by the field of view of the projector, the coordinate system associated with the field of view of the projector may be identical to the coordinate system of the displayed image so that a point having coordinates (x, y) in the displayed image also has the coordinates (x, y) in the field of view of the projector. In an embodiment in which the displayed image is a simulated image of the simulator, the displayed image may be identical to the portion of the simulator encompassed by the field of view of the projector.

In an embodiment in which there is a small difference between the displayed image and the portion of the simulator encompassed by the field of view of the projector so that the coordinate system associated with the field of view of the projector is not identical to the coordinate system of the displayed image, the coordinates of a point within the field of view of the projector may still be considered to be identical to its corresponding point within the displayed image and the size of the pointer area may be increased. In this case, the illuminated region of interest may be larger to ensure that the point(s) of the simulator corresponding to the selected point(s) are contained in the region of interest. This may be the case when the displayed image is an image captured by a camera located within the simulator, the camera is positioned adjacent to the projector and the camera has substantially the same orientation and same field of view as those of the projector.

Once the pointer area has been identified, the next step 208 comprises the generation of an overlay image based on the pointer area.

In one embodiment, the overlay image corresponds to the pointer area so that the projector will only project light within the pointer area and no light will be projected in the portion of the field of view of the projector outside of the pointer area.

In another embodiment, the overlay image is larger than the pointer area. In this case, the overlay image comprises a first and a second section. The first section corresponds to the pointer area and the second section corresponds to the remaining portion of the overlay image outside of the pointer area. In this case, the first and second sections have at least one different feature in order to visually distinguish the pointer area from the remaining of the overlay image. For example, the color of the light generated within the pointer area may be different from the color of the light generated for the remaining of the overlay image. In the same or another example, the intensity of the light may be different. For example, the intensity of the light within the pointer area may be set to zero while the intensity of the remainder of the overlay image may be greater than zero so that the region of interest is visually distinguished by not being illuminated while the area surrounding the region of interest is illuminated. In another example, the intensity of the light within the pointer area may be greater than zero while the intensity of the remainder of the overlay image may be set to zero so that the region of interest is visually distinguished by being illuminated while the area surrounding the region of interest is not illuminated.

At step 210, the projector is controlled so as to project the overlay image on the simulator, i.e., control signals indicative of the overlay image are provided to the projector, thereby visually distinguishing the region of interest of the simulator. In one embodiment, the portion of the simulator illuminated by the light projected within the pointer area of the field of view of the projector forms the region of interest of the simulator.

Figure 11:
FIG. 11 is an exemplary computer generated-image illustrating a portion of a simulator.
Figure 12:
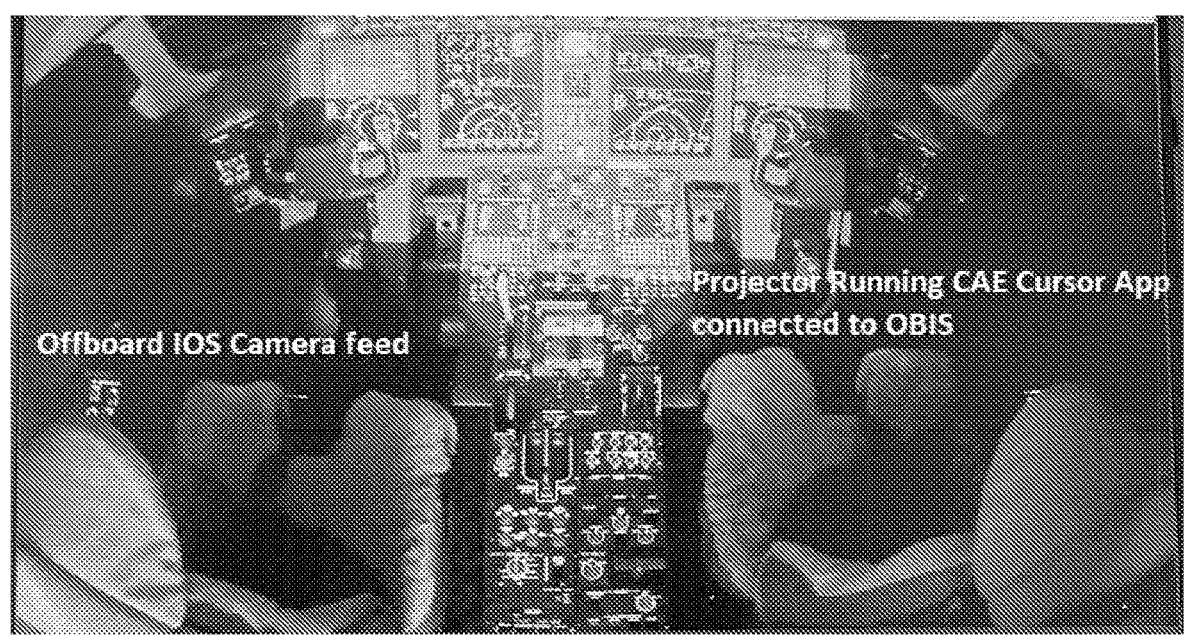
FIG. 12 is an exemplary image captured by a camera located in a simulator in which a region of interest is illuminated.

In an embodiment in which the overlay image comprises a single section that corresponds to the pointer area, the projector projects light only within the pointer area identified within its field of view. FIGS. 11 and 12 illustrate such a scenario. FIG. 11 illustrates an exemplary remotely displayed image of a portion of a cockpit. A cursor having a square shape and an orange color is displayed over the image of the cockpit. The user of the second computer machine may move the square cursor to select a region of interest to be highlighted on the cockpit of the simulator. The position of the square cursor is transmitted to the first computer machine which determines the position for the pointer area within the field of view of the projector based on the received position of the square cursor within the displayed image. The projector then projects an overlay image which corresponds to the pointer area. The overlay image is provided with a square shape and an orange color. FIG. 12 illustrates the cockpit when the overlay image is projected onto the cockpit. An orange square is then projected on the cockpit at substantially the same position on the cockpit as the position of the square cursor on portion of the cockpit represented in the displayed image.

In another embodiment in which only a given section of the overlay image corresponds to the pointer area, the projector projects the image on the simulator and the region of interest corresponds to the portion of the simulator illuminated by the given section. In order to visually distinguish the region of interest and as described above, the light emitted within the pointer area may be provided with a first color such as orange while the emitted light corresponding to the second section of the overlay image may have a second and different color such as white.

It should be understood that the size of the overlay image may be chosen so that it occupies the whole field of view of the projector, and the pointer area then corresponds to a portion of the field of view.

In one embodiment, the method 150, 200 is embodied as a system comprising a processor; and a non-transitory storage medium operatively connected to the processor, the non-transitory storage medium comprising computer readable instructions, the processor, upon executing the computer readable instructions, being configured for executing the steps of the method 150, 200.

In another embodiment, the method 150, 200 is embodied as a computer program product comprising a computer readable memory storing computer executable instructions thereon that when executed by a processor perform the steps of the method 150, 200.

Figure 13:
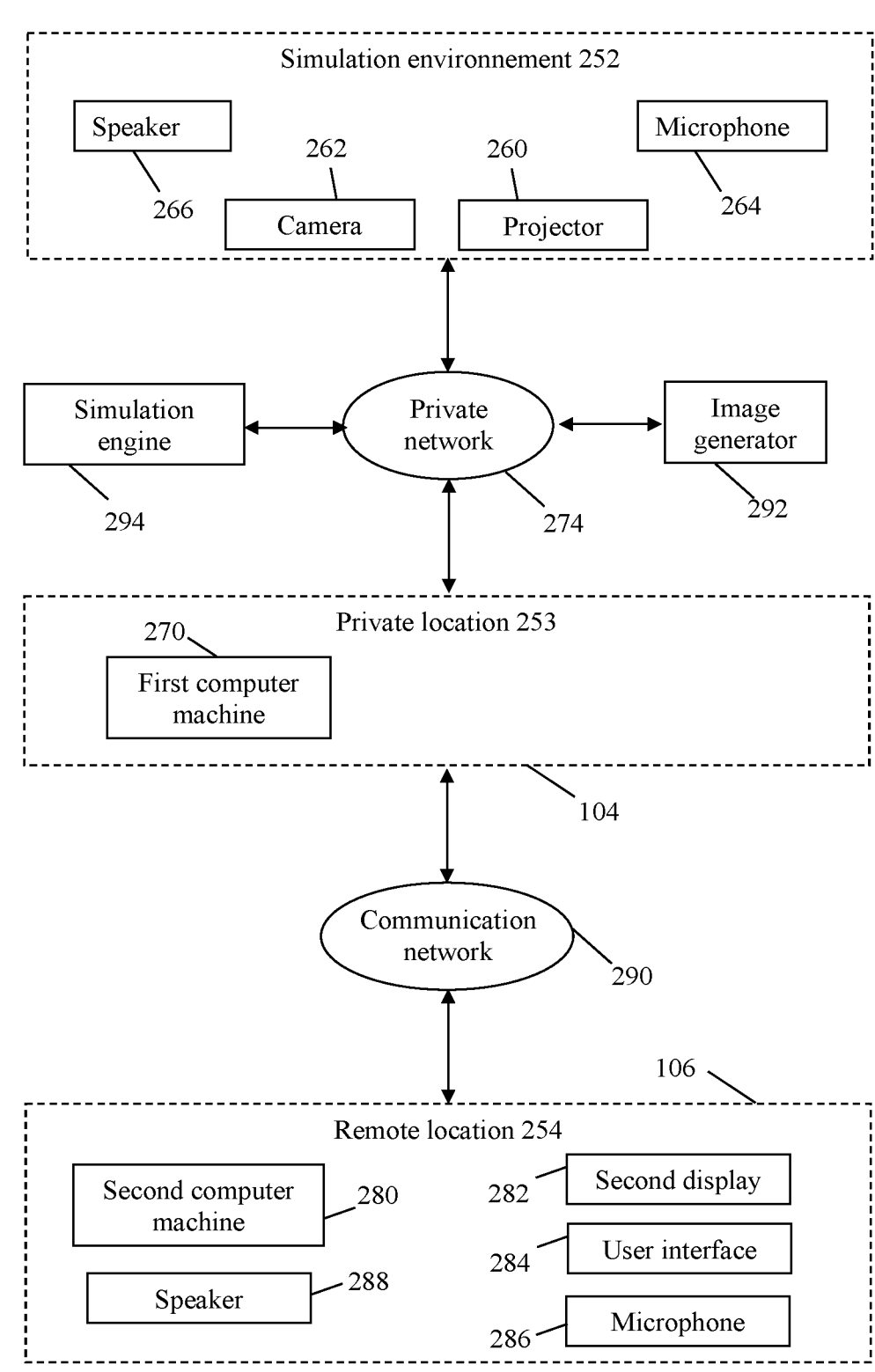
FIG. 13 is a block diagram illustrating a system for remotely controlling a projector in order to illuminate a region of interest within a simulator, in accordance with an embodiment.

FIG. 13 illustrates one embodiment of a system 250 for allowing a user to remotely point to a region of interest within a simulator.

The system 250 comprises a simulation environment or simulator 252, a private location 253 and a remote location 254. The simulator 252 comprises at least instruments and controls (not shown) with which a user of the simulator 152 interacts to perform a simulation and at least one projector 260. The simulator may further be provided with at least one camera 262 for capturing images of at least a portion of the simulator 252 such as at least a portion of the instruments and controls, at least one speaker 266 positioned within the simulator 252 and at least one microphone 264 positioned within the simulator 252.

The private location 253 comprises a first computer machine 270 configured for executing the steps of the method 200. The first computer machine 270 is also provided with a first videoconferencing client. The first computer machine 270 is in communication with the projector 260 via a private secure network 274. The first computer machine 270 may also be in communication with the camera 262, the speaker 266 and/or the microphone 264, if present in the simulator 252.

The remote location 254 comprises a second computer machine 280, a second display unit 282 and a user interface 284. It should be understood that the user interface 284 may be omitted if the second display unit 282 comprises a touch screen for example. The remote location 254 may optionally comprise a speaker 288 and a microphone 286. A second videoconferencing client is provided on the second computer machine 280. Data may be exchanged between the first videoconferencing client running on the first computer machine 270 and the second videoconferencing client running on the second computer machine 280 via a public secure network 290. It should be understood that the second computer machine 280 does not have access to the private network 274.

In one embodiment, the system 250 comprises an image generator 292 for generating an image of at least a portion of the simulator 252 such as a portion of the cockpit. The image generator 292 may be configured for generating the image from a 3D model of the simulator 252. In another embodiment, the simulator 252 comprises a camera 262 for capturing a live image of the image of at least a portion of the simulator 252.

The image is transmitted to the first computer machine 270 over the secure private network 274. The first computer machine 270 transmits the image of the simulator 252 to the second computer machine 280 through the first videoconferencing client over the secure public network 290. The second computer machine 280 receives the image of the simulator 252 through the second videoconferencing client and provides the received image to the display unit 282 for display thereon. The user of the second computer machine 280 such as an instructor may then select at least one point within the displayed image of the simulator 252. For example, if the user interface 284 comprises a mouse, the user may left-click on a given command displayed in the image in order to provide a user of the simulator 252 with a visual indication of the location of the given command within the simulator 252.

The second computer machine 280 captures the coordinates of the selected point(s) and transmits the captured coordinates to the first computer machine 270 through the second videoconferencing client over the secure public network 290. The first computer machine 270 then receives the coordinates of the selected point(s) through the first videoconferencing client and maps the received coordinates to a pointer area within the field of view of the projector 260 before generating an overlay image based on the pointer area, as described above. The first computer machine 270 transmits the overlay image to the projector 260 which projects the overlay image on the simulator 252 to illuminate the region of interest, as described above.

In one embodiment, the displayed image is static. In another embodiment, the displayed image is dynamic and may vary in time.

In one embodiment, the speakers 266 and 288 and the microphones 264 and 286 allows for audio communication between the simulator 252 and the remote location so that an instructor and a pilot may talk during a training simulation for example. In this case, a live audio feed captured by the microphone 286 is transmitted through the second videoconferencing client to the first computer machine 270 over the secure public network 290. The first computer machine 270 receives the live audio feed through the first videoconferencing client and transmitted the live audio feed to the speaker 266 to be played back within the simulator 252. Similarly, the microphone 264 captured a live audio feed from the simulator 252 and transmits the captured live audio feed to the first computer machine 270 over the secure private network 274. The first computer machine 270 then transmits the live audio feed to the second computer machine 280 through the first videoconferencing client over the secure public network 290. The second computer machine 280 receives the live audio feed through the second videoconferencing client and transmits the live audio feed to the speaker 288 to be played back.

In an embodiment in which the displayed image of the simulator is a live video feed captured by a camera located within the simulator, the orientation, position and/or zoom of the camera may be adjustable so that the camera may capture a desired view of the simulator.

In an embodiment in which the simulator is provided with a plurality of cameras each positioned and oriented for capturing a respective view of the simulator, a desired view of the simulator is obtained by selecting a given camera.

In one embodiment, the view may be selected remotely from the second computer machine when granted control over the camera via the videoconferencing platform for example. The user of the second computer machine may then remotely control the position, orientation and/or zoom of a camera located within the simulator and/or select a given camera to obtain a desired view of the simulator.

While the above description refers to one projector such as projector 260, it should be understood that the simulator may be provided with a plurality of projectors. The plurality of projectors may each cover different areas of the simulator. In this case, the method 200 further comprises a step of selecting a given projector based on the coordinates of the selected point(s) so that the region of interest to be distinguished be comprised into the field of view of the given projector.

In an embodiment in which a single projector is used, the projector has a fixed position and orientation. In another embodiment, the position and/or orientation of the projector is adjustable. In this case the method 200 may further comprise a step a determining a required movement such as a required translation or a required rotation for the projector when the region of interest is not in the field of view of the projector, and a step of moving the projector according to the determined required movement.

In one embodiment, at least one feature for the region of interest or the pointer area may be selected by the user of the second computer machine. For example, the shape, size and/or color for the region of interest or the pointer area may be selected. For example, the region of interest or the pointer area may have the shape of a circle, an arrow, an "X", etc.

In an embodiment in which a projector is used, the image projected by the projector may be animated.

In one embodiment, the method further comprises the step of determining mapping parameters to ensure alignment between the projected image and the cockpit instruments and controls. In this case, the step of mapping the coordinates comprises the step of applying the mapping parameters to the coordinates to determine the pointer area within the overlay image.

In one embodiment, the parameters are determined as a function of the position of the projector, the optical characteristics of the projector, and the geometry of the cockpit structures.

In one embodiment, the parameters are determined by projecting a series of features and identifying the location of the features on the simulator.

In one embodiment, the identification of the location of the features is performed automatically through image processing means.

In one embodiment, the projector has at least one of the following characteristics:

(a) it has a Power-Over-Ethernet (POE) capability, since power may not be easily accessible in areas of the cockpit;

(b) it has a built-in capability to run a client application; and (c) it produces low heat and minimal fan noise.

In one embodiment, the projector comprises a lens that provides the necessary cockpit coverage, HD resolution and brightness.

In one embodiment, at the off-board IOS, there is a dedicated monitor for the pointer system including a server application. The server application interfaces directly with each of the clients running on each of the projectors. The server application contains the UI management; interface with the instructor. A projector/view is selected at the IOS and the corresponding static image displayed. As the cursor moves to the desired position, the positioning data is transferred to the projector/client application. The actual cursor is viewed by the instructor using the camera feeds returning from the cockpit. The server application may contain different choices for at least some characteristics of the cursor such as the cursor symbol type, size, and color.

In one embodiment, the server application is expanded to capture predefined areas-of-interest that document usage for the purpose of product usage analytics.

In one embodiment, the use of a movable camera delivering a (3D) dynamic image may allow for reducing the number of required projectors. A 3D model of the cockpit areas is required along with additional logic to move virtually in the 3D world while displaying the pointer, as directed by the instructor. This may be achieved by creating a mapping matrix between the camera orientation (azimuth, elevation) and the simulator coordinates. This may be done manually or through a semi-automated procedure where the camera displays a test pattern (e.g., a grid) swivels through its range, stopping at each grid interval. The user is then asked to confirm the grid location on its interface display.

In one embodiment, the remote pointing method and system is quicker, more intuitive and less ambiguous than verbally describing the area of interest.

In one embodiment, the method 10 may be adapted to further comprise the steps of the method 200 so that a user of the second computer machine may remotely point to a region of interest within the simulator using a same videoconferencing platform.

Similarly, the system 100 may be configured to allow a user of the second computer machine 130 to point to a region of interest within the simulator 102. In this case, the first computer 120 is configured for transmitting an image of at least a portion of the simulator 102 through the first videoconferencing client over the secure public network 138 and the second computer machine 130 is configured for receiving the image of the portion of the simulator 102 through the second videoconferencing client and displaying the received image on the display unit 132. The second computer machine is further configured for capturing coordinates of at least one point selected within the image by the user of the second computer machine 130 and transmitting the captured coordinates to the first computer machine 120 through the second videoconferencing client over the secure public network 138. Upon receiving the coordinates, the first computer machine 120 identifies a corresponding region of interest within the simulator 102 based on the received coordinates and controls a light source present in the simulator 102, such as a projector, to illuminate the region of interest within the simulator 102 in order to visually distinguish the region of interest.

The embodiments of the invention described above are intended to be exemplary only. The scope of the invention is therefore intended to be limited solely by the scope of the appended claims.

We claim:

1. A computer-implemented method for remotely pointing to a region of interest within a simulator, the computer-implemented method comprising:

receiving a first live camera feed comprising a first portion of the simulator, the first portion received from a first camera;

receiving at least one of: a simulation control interface associated with the simulator, a computer-generated representation of the simulator, and a second live camera feed comprising a second portion of the simulator, the second portion received from a second camera;

generating a given image comprising a first image from the first live camera feed and a second image from the at least one of: the simulation control interface, the computer-generated representation of the simulator, and the second live camera feed comprising the second portion;

receiving coordinates of at least one point selected within the given image of at least a portion of the simulator, the given image being displayed on a display unit;

identifying a region of interest within the simulator based on the received coordinates of the at least one point, the region of interest comprising at least one selected from the group of: a button, an actuator, an instrument and a control; and providing control signals to a projector to visually distinguish the region of interest to a person who is within the simulator.

2. The computer-implemented method of claim 1, wherein:

said identifying the region of interest within the simulator comprises mapping the received coordinates to a pointer area within a coordinate system associated with the projector; and said providing control signals comprises generating an overlay image based on the pointer area, the overlay image encompassing the region of interest, and providing the control signals to the projector to project the overlay image on the simulator.

3. The computer-implemented method of claim 2, wherein said mapping the received coordinates to the pointer area comprises:

mapping the received coordinates to at least one given point within a coordinate system of the simulator; and mapping the at least one given point to the pointer area within the coordinate system associated with the projector.

4. The computer-implemented method of claim 1, further comprising:

establishing over a telecommunication network a connection between a first videoconferencing client running on a first computer and a second videoconferencing client running on a second computer; and transmitting through the first videoconferencing client the given image to the second computer, the second computer providing the given image for display on remote display unit, wherein said receiving the coordinates comprises receiving the coordinates through the first videoconferencing client from the second computer over the secure public network.

5. The computer-implemented method of claim 1, wherein said providing the control signals comprises selecting the projector amongst a plurality of available projectors based on the received coordinates and providing the control signals to the selected projector.

6. The computer-implemented method of claim 1, wherein said providing the control signals comprises determining a target position for the projector, the target position ensuring that the region of interest is contained within a field of view of the projector and providing the control signals being further indicative of the target position.

7. The computer-implemented method of claim 1, further comprising one of:

receiving the given image of the at least a portion of the simulator from a camera located within the simulator; and generating the given image of at least a portion of the simulator.

8. The computer-implemented method of claim 1, wherein said receiving coordinates comprises receiving coordinates for a plurality of points selected within the given image, said identifying the region of interest comprises identifying a plurality of regions of interest based on the received coordinates for the plurality of points, and said providing the control signals comprises providing the control signals to the projector to visually and concurrently distinguish the plurality of regions of interest to the person who is within the simulator.

9. The computer-implemented method of claim 1, further comprising selecting at least one characteristic for the pointer area, the control signals being indicative of the at least one characteristic.

10. A system for remotely pointing to a region of interest within a simulator, the system comprising:

a processor; and a non-transitory storage medium operatively connected to the processor, the non-transitory storage medium comprising computer readable instructions, the processor, upon executing the computer readable instructions, being configured for:

receiving a first live camera feed comprising a first portion of the simulator, the first portion received from a first camera;

receiving at least one of: a simulation control interface associated with the simulator, a computer-generated representation of the simulator, and a second live camera feed comprising a second portion of the simulator, the second portion received from a second camera;

generating a given image comprising a first image from the first live camera feed and a second image from the at least one of: the simulation control interface, the computer-generated representation of the simulator, and the second live camera feed comprising the second portion;

receiving coordinates of at least one point selected within the given image of at least a portion of the simulator, the given image being displayed on a display unit;

identifying a region of interest within the simulator based on the received coordinates of the at least one point, the region of interest comprising a button, actuator, instrument or control, the region of interest comprising at least one selected from the group of: a button, an actuator, an instrument and a control; and providing control signals to a projector to visually distinguish the region of interest to a person who is within the simulator.

11. The system of claim 10, wherein the processor is configured for:

mapping the received coordinates to a pointer area within a coordinate system associated with the projector;

generating an overlay image based on the pointer area, the overlay image encompassing the region of interest; and providing the control signals to the projector to project the overlay image on the simulator.

12. The system of claim 11, wherein the processor is configured for:

mapping the received coordinates to at least one given point within a coordinate system of the simulator; and mapping the at least one given point to the pointer area within the coordinate system associated with the projector.

13. The system of claim 10, wherein the processor is configured for:

establishing over a telecommunication network a connection between a first videoconferencing client running on a first computer and a second videoconferencing client running on a second computer; and transmitting through the first videoconferencing client the given image to the second computer, the second computer providing the given image for display on remote display unit, wherein said receiving the coordinates comprises receiving the coordinates through the first videoconferencing client from the second computer over the secure public network.

14. The system of claim 13, wherein the telecommunication network comprises one of a public network, a secure public network, a private network and a secure private network.

15. The system of claim 10, wherein the processor is further configured selecting the projector amongst a plurality of available projectors based on the received coordinates and providing the control signals to the selected projector.

16. The system of claim 10, wherein the processor is further configured for determining a target position for the projector, the target position ensuring that the region of interest is contained within a field of view of the projector and providing the control signals being further indicative of the target position.

17. The system of claim 10, wherein the processor is further configured for one of:

receiving the given image of the at least a portion of the simulator from a camera located within the simulator; and generating the given image of at least a portion of the simulator.

18. The system of claim 10, wherein the processor is configured for receiving coordinates for a plurality of points selected within the given image, identifying a plurality of regions of interest based on the received coordinates for the plurality of points, and providing the control signals to the projector to visually and concurrently distinguish the plurality of regions of interest to the person who is within the simulator.

19. The system of claim 10, wherein the processor is further configured for selecting at least one characteristic for the pointer area, the control signals being indicative of the at least one characteristic.

20. A computer program product for remotely pointing to a region of interest within a simulator, the computer program product comprising a computer readable memory storing computer executable instructions thereon that when executed by a processor perform the method steps of:

receiving a first live camera feed comprising a first portion of the simulator, the first portion received from a first camera;

receiving at least one of: a simulation control interface associated with the simulator, a computer-generated representation of the simulator, and a second live camera feed comprising a second portion of the simulator, the second portion received from a second camera;

generating a given image comprising a first image from the first live camera feed and a second image from the at least one of: the simulation control interface, the computer-generated representation of the simulator, and the second live camera feed comprising the second portion;

receiving coordinates of at least one point selected within the given image of at least a portion of the simulator, the given image being displayed on a display unit;

identifying a region of interest within the simulator based on the received coordinates of the at least one point, the region of interest comprising a button, actuator, instrument or control, the region of interest comprising at least one selected from the group of: a button, an actuator, an instrument and a control; and providing control signals to a projector to visually distinguish the region of interest to a person who is within the simulator.

\* \* \* \* \*